(12) United States Patent
Swaminathan et al.

(10) Patent No.: US 6,961,320 B1
(45) Date of Patent: Nov. 1, 2005

(54) IN-BAND TRANSMISSION OF TTY/TTD SIGNALS FOR SYSTEMS EMPLOYING LOW BIT-RATE VOICE COMPRESSION

(75) Inventors: Kumar Swaminathan, North Potomac, MD (US); Udaya Bhaskar, North Potomac, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 1122 days.

(21) Appl. No.: 09/669,283

(22) Filed: Sep. 26, 2000

Related U.S. Application Data

(60) Provisional application No. 60/194,295, filed on Apr. 3, 2000.

(51) Int. Cl.[7] .......................... H04L 5/22; H04M 11/00
(52) U.S. Cl. ..................... 370/298; 370/300; 379/52
(58) Field of Search ................ 370/298–300, 370/352, 466, 526; 375/275, 289; 379/52, 379/88.13; 704/220, 270.1, 271

(56) References Cited

U.S. PATENT DOCUMENTS

| | | | | |
|---|---|---|---|---|
| 4,426,555 A | * | 1/1984 | Underkoffler | 379/52 |
| 5,517,548 A | * | 5/1996 | Engelke et al. | 379/52 |
| 5,666,357 A | * | 9/1997 | Jangi | 370/466 |
| 5,710,806 A | * | 1/1998 | Lee et al. | 379/52 |
| 6,012,024 A | * | 1/2000 | Hofmann | 704/219 |
| 6,345,251 B1 | * | 2/2002 | Jansson et al. | 704/270 |
| 6,351,495 B1 | * | 2/2002 | Tarraf | 379/52 |
| 6,381,472 B1 | * | 4/2002 | LaMedica et al. | 379/52 |
| 6,434,198 B1 | * | 8/2002 | Tarraf | 375/259 |
| 6,628,967 B1 | * | 9/2003 | Yue | 379/52 |
| 6,650,662 B1 | * | 11/2003 | Arnaud et al. | 370/526 |

* cited by examiner

*Primary Examiner*—Steven Nguyen
(74) *Attorney, Agent, or Firm*—Craig Plastrik

(57) ABSTRACT

A method, system, and software product for transmitting TTY/TDD signals in a system employing low bit-rate voice compression are disclosed. The method includes receiving an input signal and generating a teletypewriter (TTY) indicator signal from the input signal. Whether or not the input signal is a TTY signal including a TTY character, is determined based on the TTY indicator signal. A TTY packet including the TTY character of the TTY signal is constructed and transmitted if the input signal is determined to be a TTY signal. A method, system, and software product for receiving and decoding TTY/TDD signal is also disclosed.

32 Claims, 23 Drawing Sheets

IN-BAND TRANSMISSION OF TTY/TTD SIGNALS FOR SYSTEMS EMPLOYING LOW BIT-RATE VOICE COMPRESSION

RELATED APPLICATIONS

This application is based on and claims priority under 35 U.S.C. § 119(e) from provisional application entitled "In-Band Transsmion of TTY/TDD Signals for Systems that Employ low Bit-Rate Voice Compression", which was filed on Apr. 3, 2000, and accorded Ser. No. 60/194,295.

BACKGROUND OF THE INVENTION

1. Field of the Invention

The present invention relates to the in-band transmission of TTY (teletypewriter) signals through wireless systems, and more specifically to the in-band transmission of TTY signals through wireless systems that employ low bit-rate voice compression.

2. Discussion of the Background

Recently, FCC has mandated that US wireless carriers to provide E911 capability to the hearing and speech impaired by enabling this capability through interfaces with TTY/TDD terminals. To meet this mandate, TIA TR41 had assembled an ad hoc committee on Telecommunications Devices for the Deaf (TDD). This ad hoc committee has drafted the specifications for all TTY/TDD terminals for which this FCC mandate applies. These specifications are listed in EIA standards PN-1663, "Telecommunications Devices for the Deaf," January 1985, and are a subset of ITU-T Recommendation v.18, which is incorporated herein by reference.

The EIA standards document requires all TTY/TDD terminals covered by the FCC mandate to provide Baudot code operation employing half-duplex asynchronous transmission. Baudot operation employs frequency shift keying techniques to encode 0's (denoted as SPACE) and 1's (denoted as MARK). The frequency 1400 Hz is used for denoting MARK and 1800 Hz is used for denoting SPACE. Every bit is represented by either the MARK or SPACE frequency for a duration of 22 ms. The set of 5-bit Baudot codes is listed in EIA standards PN-1663. Both letters as well as figures are accommodated in this list by utilizing specific shift codes. Each 5-bit TTY character is encoded using the format shown in Table 1.

TABLE 1

Format of TTY character

| Bit Signal | Start Space | Data LSB | Data Bit 2 | Data Bit 3 | Data Bit 4 | Data MSB | Stop Mark |
|---|---|---|---|---|---|---|---|
| #Bits | 1 | 1 | 1 | 1 | 1 | 1 | 1.5–2.0 |

Note that data bits are encoded as SPACE if they are 0 and as MARK if they are 1. The nominal transmit level for the TTY signal is −10 dBm. Finally, at the end of the TTY session a MARK hold tone is transmitted for an additional period of 150–300 ms.

The testing of systems that support TTY/TDD terminals for cellular and PCS carriers was addressed by Lober and Walsh who established an industry standard test procedure. This test procedure is described in Lober and Walsh Engineering, Inc.—Cellular Product Technologies, LLC, NENA/BellSouth Technologies, Inc., "TTY Over Cellular Laboratory and Field Test Procedure," September 1998, which is incorporated herein by reference. Briefly, this test procedure generates random character files. These source character files are subsequently converted to an audio signal by a TTY/TDD generator terminal and transmitted over the system under test. The received audio files are fed to a TTY/TDD receiver terminal which converts them into an output character file. The Lober and Walsh test procedure compares the output character file with the source character file and presents the results as TCER (total character error rate) as well as PCER (printable character error rate). Currently, the consensus in the GTF or CDG bodies is that in order to meet the FCC mandate for cellular and PCS carriers, the TCER must be less than 1% across the cell for all operating conditions, i.e., above 16 dB C/N for downlink and 18 dB C/N for uplink.

In wireless systems that employ high bit rate codecs (16 Kbps and above), the in-band transmission of these TTY signals may not present a problem. However for systems that employ low bit-rate voice codecs, the FCC mandate presents a hurdle.

SUMMARY OF THE INVENTION

Accordingly, one object of this invention is to provide a novel method, system, and computer program product that permits wireless systems that employ low bit-rate voice compression to comply with government mandates (e.g., Federal Communications Commissions (FCC) mandates) while supporting TTY/TDD terminals for the benefit of the hearing impaired. Another object of the present invention is to provide a novel method, system, and computer program product for detecting TTY signaling reliably, encoding TTY signaling in-band, and regenerating the encoded TTY signaling at a receiver.

The method, on which the system and software product are based, includes the steps of receiving an input signal; generating a teletypewriter (TTY) indicator signal from the input signal; determining that the input signal is a TTY signal comprising a TTY character, based on the TTY indicator signal; and constructing a TTY packet including the TTY character of the TTY signal in response to determining that the input signal is a TTY signal.

Accordingly, the present invention permits wireless systems that employ low bit-rate voice compression for spectral efficiency reasons to comply with the FCC mandate that all U.S. wireless carriers provide E911 capability to the hearing and speech impaired by enabling E911 capability through interfaces with TTY/TDD terminals. Moreover, the present invention reliably detects TTY signaling, thereby overcoming the problem that low bit-rate voice compression devices are typically tailored for voice and consequently have difficulty in passing TTY signaling with adequate fidelity. By way of example only, the present invention is described in the context of a 5.6 Kbps speech codec with 20 ms frame size designed to operate in half-rate fashion for the IS-136+system with 8-PSK modulation. However, this solution is general enough that it could be applied in any system that employs any low bit-rate codec.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
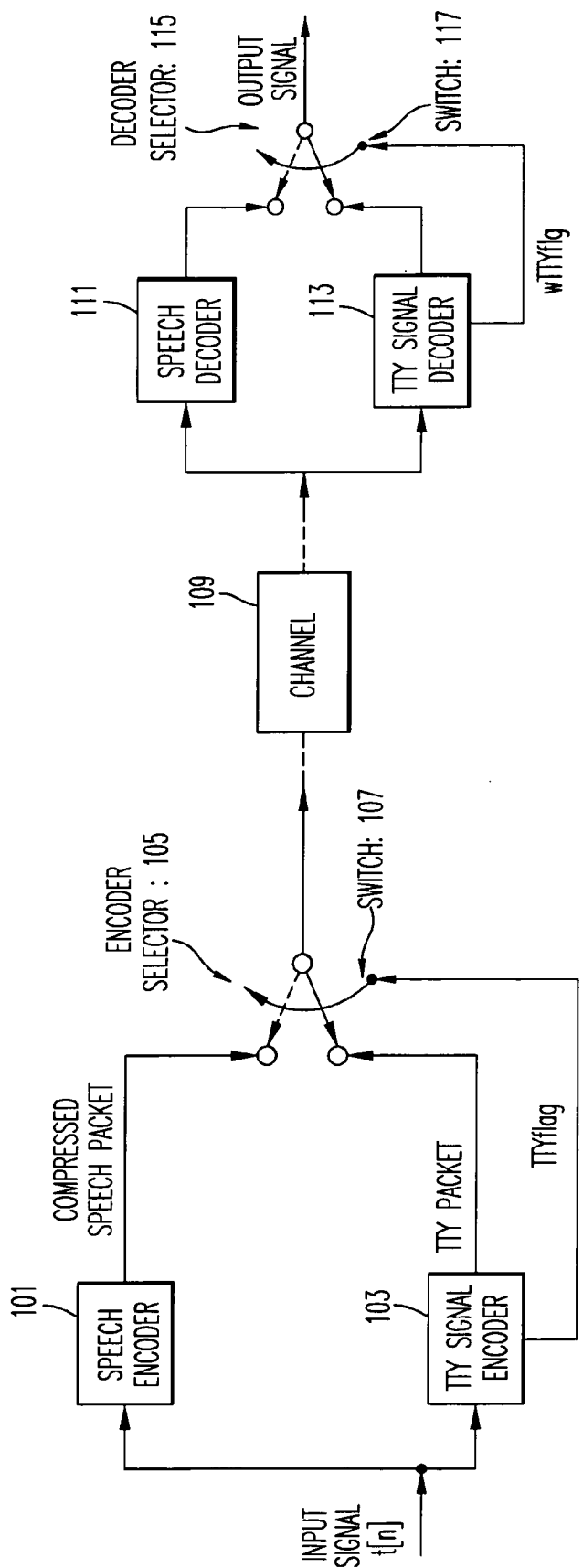
FIG. 1 is a schematic block diagram of a system for in-band transmission of TTY/TDD signals for systems that employ low bit-rate voice compression, according to one embodiment of the invention.

Referring now to the drawings, wherein like reference numerals designate identical or corresponding parts throughout the several views, FIG. 1 is a schematic block diagram of a system for the in-band transmission of TTY/TDD signals for systems that employ low bit-rate voice compression, according to one embodiment of the invention.

The system of FIG. 1 includes a speech encoder 101, a TTY signal encoder 103, an encoder selector 105, a switch 107, one or more communications channels 109, a speech decoder 111, a TTY signal decoder 113, a decoder selector 115, and a switch 117.

Speech encoder 101, TTY signal encoder 103, encoder selector 105, and switch 107 are individual software modules of an encoder program for encoding speech and TTY signals, according to one embodiment. In alternative embodiments, one or more of these software modules are fully or partially implemented with application specific circuitry. Speech decoder 111, TTY signal decoder 113, decoder selector 115, and switch 117, are individual software modules of a decoder program for decoding speech and TTY signals, according to one embodiment. In alternative embodiments, one or more of these software modules are fully or partially implemented with application specific circuits.

Speech encoder 101 receives an input signal t[n], encodes the input signal t[n] according to any suitable speech encoding scheme, and outputs compressed speech packets. TTY signal encoder 103 receives the input signal t[n] and outputs TTY packets and a variable TTYflag, which are described in greater detail below. Encoder selector 105 selects either compressed speech packets output by speech encoder 101 or TTY packets output by TTY signal encoder 103 on the basis of switch 107. When TTYflag is TRUE, then switch 107 causes encoder selector 105 to select TTY packets for transmission over communication channel 109. When TTYflag is FALSE, then switch 107 causes encoder selector 105 to select compressed speech packets for transmission over communication channel 109. Thus, speech encoder 101 and TTY signal encoder 103 operate in parallel and either the compressed speech packets output by the speech encoder 101 or the TTY packets output by TTY signal encoder 103 are transmitted over the communication channel 109, based on the value of TTYflag. TTY signal encoder 103 detects whether the input signal t[n] is a speech signal or a TTY signal and sets TTYflag equal to TRUE when input signal t[n] is a TTY signal and sets TTYflag equal to FALSE when input signal t[n] is a speech signal.

Communication channel 109 is any suitable medium for transmitting wireless communications. The present invention may be adopted for use with any speech compression scheme and digital cellular system, such as global system for mobile communications (GSM) and code-division multiple access (CDMA). Communications channel 109 also includes hardware and software along the communications path between the encoder selector 105 and speech decoder 111 and TTY signal decoder 113.

Speech decoder 111 decodes data received from the encoder selector 105 according to any suitable speech decoding scheme that complements the speech encoding scheme used by speech encoder 101. TTY signal decoder 113 decodes data received from the encoder selector 105 according to any suitable TTY signal decoding scheme that complements the TTY signal encoding scheme employed by TTY signal encoder 103. TTY signal decoder 113 also determines whether the data received from the encoder selector 105 over communications channel 109 is a compressed speech signal or a compressed TTY signal. If TTY signal decoder 113 determines that the signal output by encoder selector 105 is compressed speech, then TTY signal decoder sets the value of wTTYflg equal to FALSE. If TTY signal 113 determines that data received from the encoder selector 105 is a compressed TTY signal, then TTY signal decoder 113 sets the value of wTTYflg equal to TRUE.

Decoder selector 115 selects the output of the speech decoder 111 or the output of TTY signal decoder 113, on the basis of switch 117. If wTTYflg=FALSE, then switch 117 causes decoder selector 115 to select decoded speech output from speech decoder 111 as the output signal on the decoder side. If wTTYflg =TRUE, then switch 117 causes the decoded TTY signal output by TTY signal decoder 113 to be output as the output signal on the decoder side of the system of FIG. 1.

It is to be understood that the system of FIG. 1 is for exemplary purposes only, as many variations of the present invention are possible. For example, speech encoder 101 and speech decoder 111, and channel 109 may be part of the pre-existing speech compression system, and TTY signal encoder 103, encoder selector 105, switch 107, TTY signal decoder 113, decoder selector 115, and switch 117 are added to the existing speech compression system in order to implement the present invention. Thus, the present invention may be implemented with existing speech compression systems, regardless of the particular type of speech compression system employed.

Accordingly, the system of FIG. 1 includes TTY signal encoder 103 at the transmit side and TTY signal decoder 113 at the receive side. TTY signal encoder detects TTY/TDD characters. Once decoder 113 detects a TTY character, the TTY character is encoded in a special format into a TTY packet of the same length as the compressed speech packet output by speech encoder 101, which operates in parallel with speech encoder 101. Although the present invention may be implemented with a variety of speech compression schemes, for purposes of explanation, it is assumed that the compressed speech bitstream is arranged in decreasing order of perceptual importance for purposes of selective error protection. When a TTY character is detected, the TTY packet overwrites the compressed speech packet. The TTY packet is repeated 7 more times in the next 7 successive speech frames. Following this, the next compressed speech packet is zeroed out. Thus, a TTY character results in 9 successive compressed speech packets being overwritten. This procedure provides greater immunity with respect to transmission fades, drop outs, and other impairments.

The TTY packet is distinct from any compressed speech packet. Only the first 12 bits of the TTY packet carry information which include a 2 bit distinct TTY header, the start bit, the 5 data bits, TTY character number (modulo 4), and the repetition number of the TTY character (between 0 and 7). The start bit is used to differentiate between a regular TTY character and a MARK hold tone. The remaining bits of the TTY packet are set to zero. Table 2 summarizes the structure of the TTY packet.

TTY signal decoder 113 determines whether the received compressed speech packet is a TTY packet. It does so on the basis of the TTY header, the Hamming weight of the remaining bits (from Bit# 13 onwards) of the received compressed speech packet, and the bad frame indicator flag that accompanies any received compressed speech packet. The received compressed speech packet is declared to be a TTY packet if the TTY header is valid, the Hamming weight of the remaining bits (from Bit#13 onwards) is zero, and the bad frame indicator indicates a good received packet. In one 5.6 Kbps speech codec design, only the Hamming weight of the bits from Bit#13 to Bit#31 is considered since the first 32 bits correspond to the most heavily protected class of bits. In addition, the TTY character number and TTY character repetition number are used to verify that the received TTY character is a new TTY character and not a repetition of the previous TTY character.

TABLE 2

TTY Packet Structure

| Bit # in TTY packet | Description |
| --- | --- |
| 0 | TTY header - bit 0 |
| 1 | TTY header - bit 1 |
| 2 | Start bit |
| 3 | Data bit 0 (LSB) |
| 4 | Data bit 1 |
| 5 | Data bit 2 |
| 6 | Data bit 3 |
| 7 | Data bit 4 (MSB) |
| 8 | TTY Character # - bit 0 |
| 9 | TTY Character # - bit 1 |
| 10 | TTY Character Repetition # - bit 0 |
| 11 | TTY Character Repetition # - bit 1 |
| 12 | TTY Character Repetition # - bit 2 |
| Remainingbits | 0 |

Once the TTY signal decoder 113 receives a new TTY packet, it is stored in a suitable memory (e.g., a buffer memory), and the corresponding TTY signal is generated by TTY signal decoder 1113 in subsequent frames. Speech decoder 1111 operates in parallel with TTY signal decoder 113. Whenever the TTY signal has been generated, a TTY signal buffer overwrites the speech output buffer.

Figure 2:
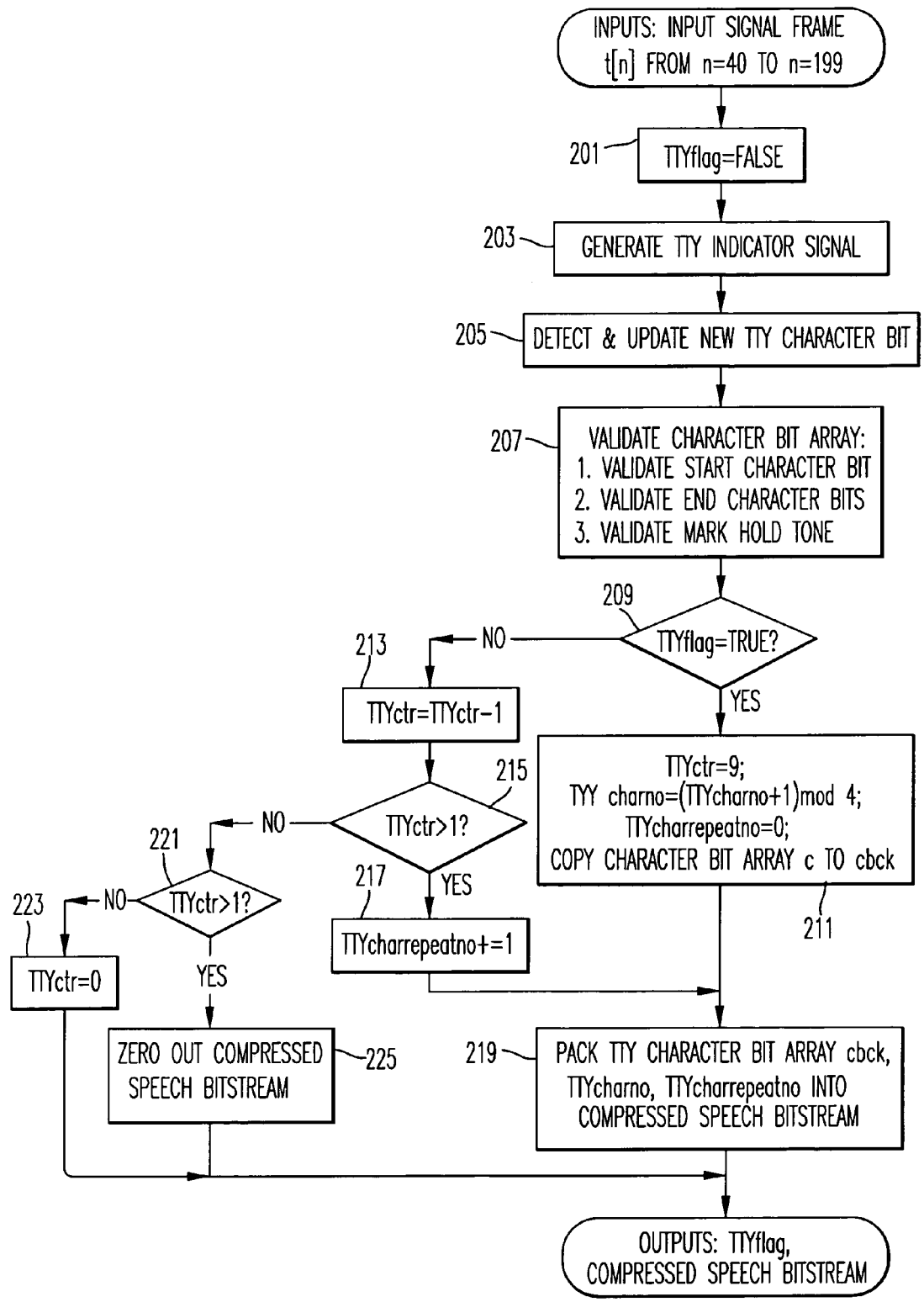
FIG. 2 is a flowchart for explaining the operation of the signal encoder according to one embodiment of the invention.

FIG. 2 describes the operation of TTY signal encoder 103. In step 201, TTYflag is set equal to FALSE. For explanatory purposes, the input signal, denoted by t[n], is assumed to be stored from n=40 to n=199 for every 20 ms frame. In this exemplary description, the previous 40 samples of the input signal are also used in TTY encoder 103. This input signal buffer is used in step 203 to generate a TTY indicator signal which denotes every sample from n=20 to n=179 as either MARK, SPACE, UNKNOWN, or NOTMARKORSPACE. Generation of the TTY indicator signal is described in greater detail below with respect to FIG. 3. In step 205, the TTY indicator signal is then used to detect any new TTY character bit and update a TTY character bit array, c. This procedure is described in greater detail with respect to FIGS. 11A and 11B.

Figure 16:
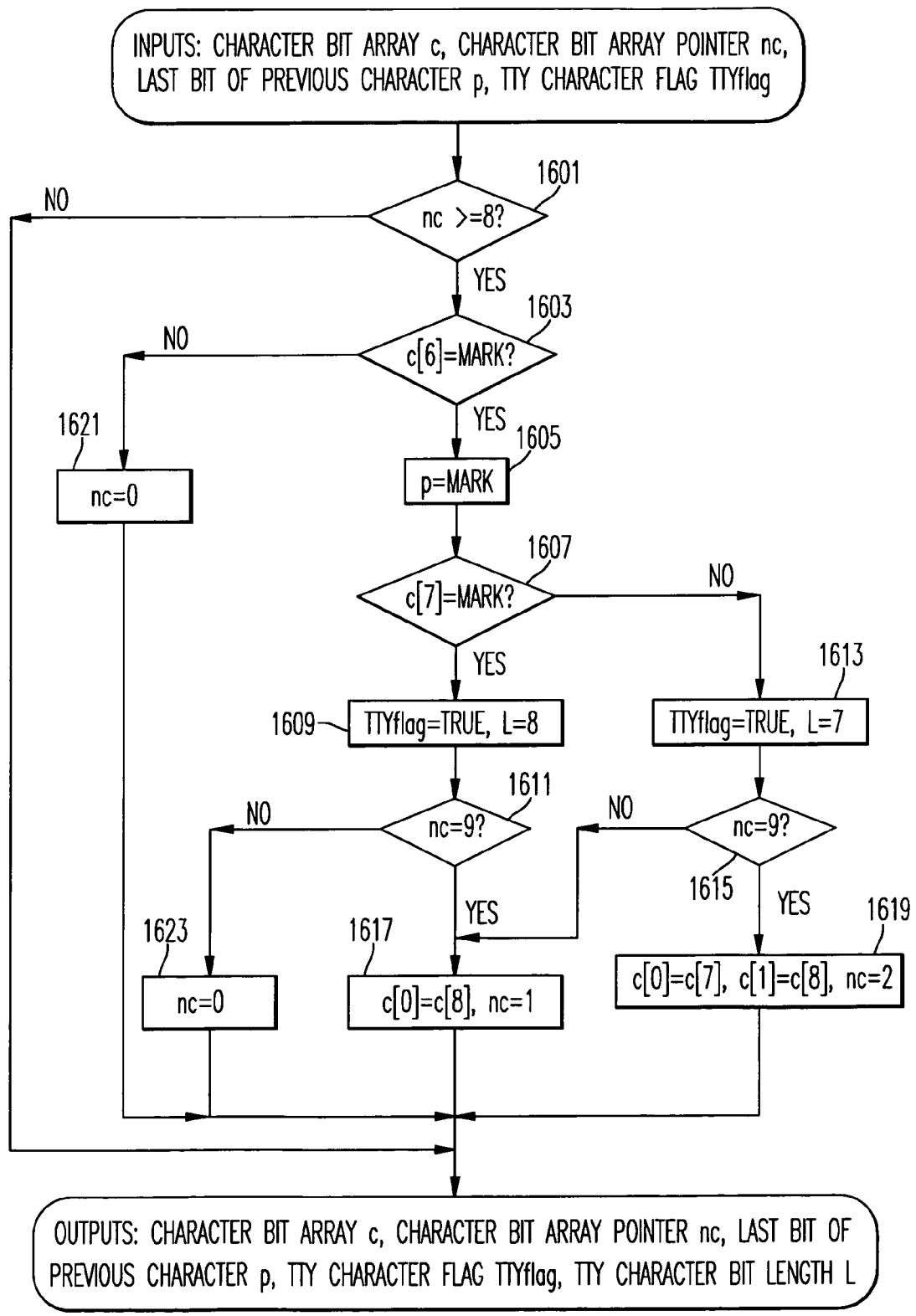
FIG. 16 is a flowchart for explaining how end bits of a character array are validated, according to one embodiment of the invention.
Figure 17:
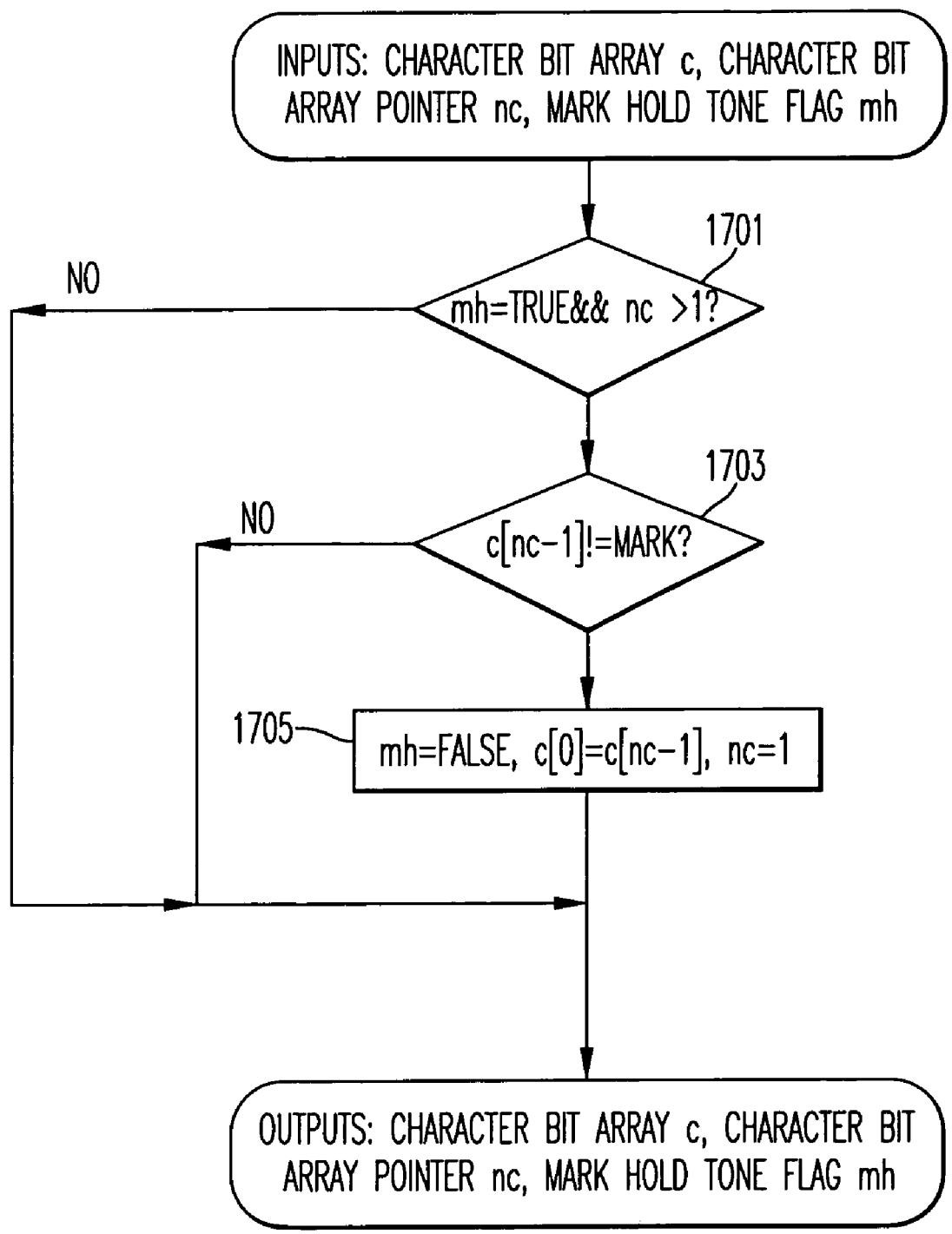
FIG. 17 is a flowchart for explaining how a MARK hold tone is validated, according to one embodiment of the invention.

In step 207, the TTY character bit array undergoes validation of the start character bit (see FIG. 15), validation of the end character bits (see FIG. 16), and validation of the MARK hold tone (see FIG. 17). A completely validated TTY character bit array results in TTYflag, which is initialized to FALSE, being set to TRUE. As explained above, a valid TTY character results in the construction of a special TTY packet, as shown in Table 2, which is then used to overwrite the compressed speech packet for that frame. Steps 209 through 225 in FIG. 2 describe how this TTY packet is repeated eight times in succession and how the subsequent one compressed speech packet is then zeroed out as described above.

In step 209 TTY signal encoder 103 determines whether TTYflag is TRUE. If TTYflag=TRUE, then in steps 211 and 219, the TTY signal encoder 103 generates a TTY packet.

In step 211 TTYctr is set equal to 9, TTYcharno is set equal to (TTYcharno+1) mod 8, TTYcharrepeatno is set equal to 0, and the TTY character bit array, c, is copied to the TTY character bit array, cbck. TTYctr is a local counter. TTYcharno is a two-bit index assigned to a TTY character. Successful TTY characters are numbered as 0, 1, 2, 3, 0, 1, 2, 3. TTYcharrepeatno is a three-bit index (since each TTY character is repeated eight times) denoting the repetition number for each TTY character. Both TTYcharno and TTYcharrepeatno are used to determine whether a new TTY packet contains the repetition of a TTY character or a new TTY character.

Then, in step 219, the compressed speech packet is overwritten by packing the TTY character bit array (cbck), TTYcharno, and TTYcharrepeatno into the compressed speech bitstream.

If TTYflag is FALSE in step 209, then the compressed speech bitstream is not overwritten and TTYctr is decreased by 1 in step 213. In step 215 the TTY signal encoder 103 determines whether TTYctr is greater than 1. If TTYctr is greater than 1, then in step 217 TTYcharrepeatno is incremented by 1 in step 217, and the process proceeds to step 219. If, in step 215 TTYctr is not greater than 1, then in step 221 the TTY signal encoder determines whether TTYctr is greater than 0. If TTYctr is greater than 0 in step 221, then in step 225 the compressed speech bitstream is zeroed out in step 225. If in step 221 TTYctr is not greater than 0, then in step 223 TTYctr is set equal to 0 and the speech bitstream is not overwritten until TTYflag is determined to be TRUE in step 209. Accordingly, by setting TTYctr equal to 9 in step 211, when TTYflag changes to FALSE in step 207, then the TTY packet is repeated seven more times (for a total of eight times) in steps 213, 215, 217 and 219. Then, in steps 221 and 225 one speech packet is zeroed out before speech packets are again transmitted (i.e., when TTYctr=0 in step 223).

Figure 3:
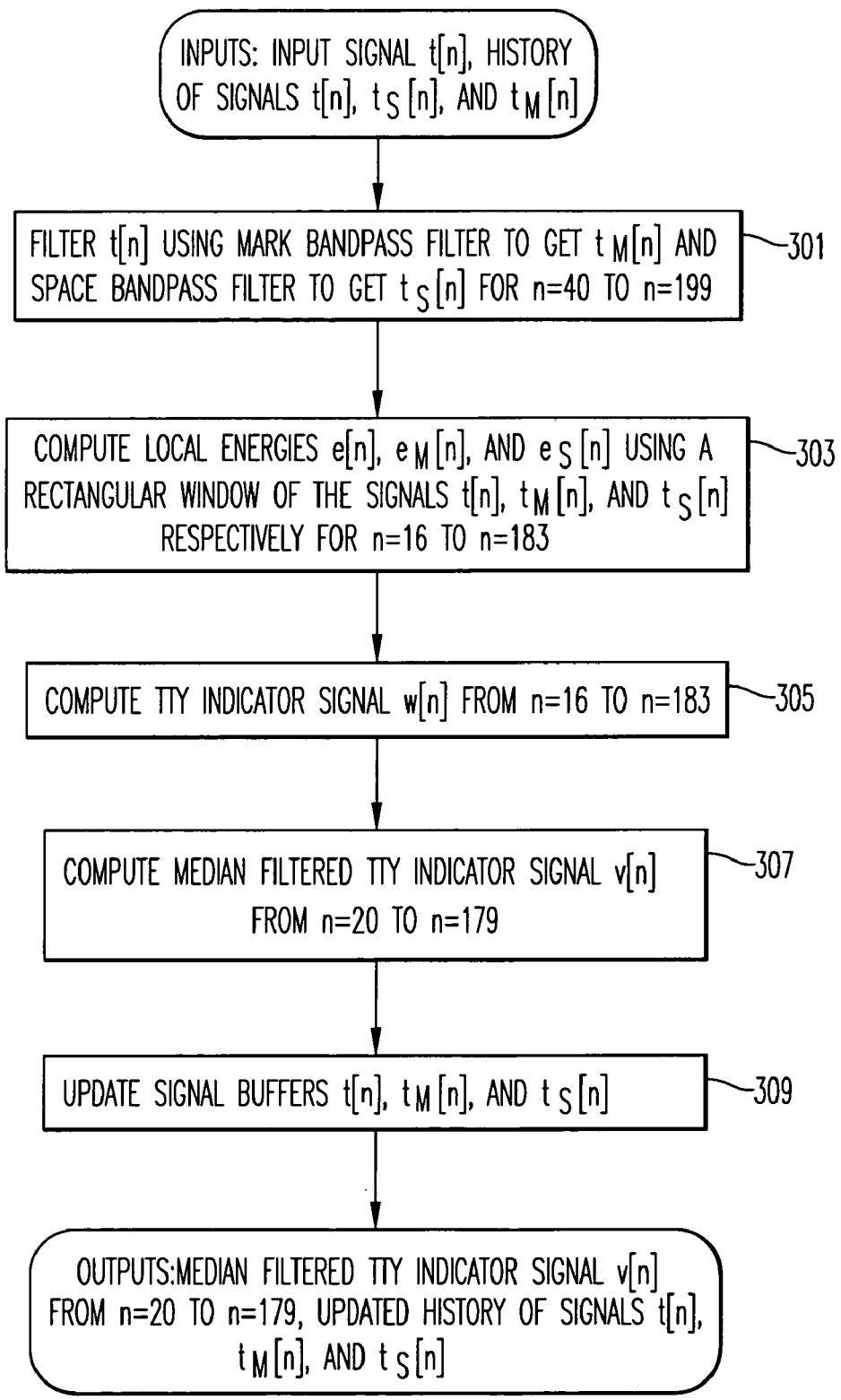
FIG. 3 is a flowchart for explaining how a raw TTY indicator signal is generated according to one embodiment of the invention.

FIG. 3 is a flowchart for explaining generation of the TTY indicator signal in step 203 of FIG. 2. In step 301 of FIG. 3 the input signal $t_M[n]$ is filtered with a MARK bandpass filter to get the corresponding output signal $t_M[n]$ and filtered with a SPACE bandpass filter to get the corresponding output signal $t_S[n]$ for samples n=40 to n=199. Step 301 is described in greater detail below with respect to FIGS. 4–7.

In step 303 local energies e[n], $e_M[n]$, and $e_S[n]$ of the respective signals t[n], $t_M[N]$, and $t_S[n]$ are computed. These local energies are computed using a rectangular window of the corresponding signals t[n], $t_M[n]$, and $t_S[n]$, respectively, for n=16 to n=183. The computation of local energies in step 303 is described in greater detail below with respect to FIG. 8.

In step 305 the TTY indicator signal w[n] is computed from n=16 to n=183. The computation of the TTY indicator signal is described in greater detail below with respect to FIGS. 9A and 9B.

In step 307 a median filtered TTY indicator signal v[n] is computed from n=20 to n=179. The computation of the median filtered TTY indicator signal is described in greater detail below with respect to FIGS. 10A and 10B.

In step 309 the signal buffers for t[n], $t_M[n]$, and $t_S[n]$ are updated for the next frame (i.e. for the next n=40 to n=199 samples).

Figure 4:
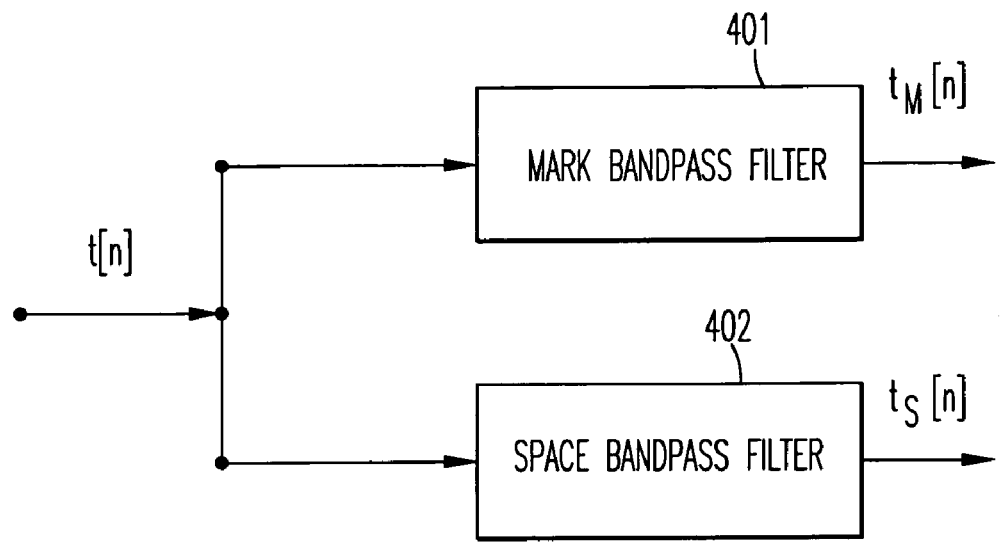
FIG. 4 is a schematic block diagram showing how an input signal is applied to a MARK bandpass filter and a SPACE bandpass filter, according to one embodiment of the invention.
Figure 5:
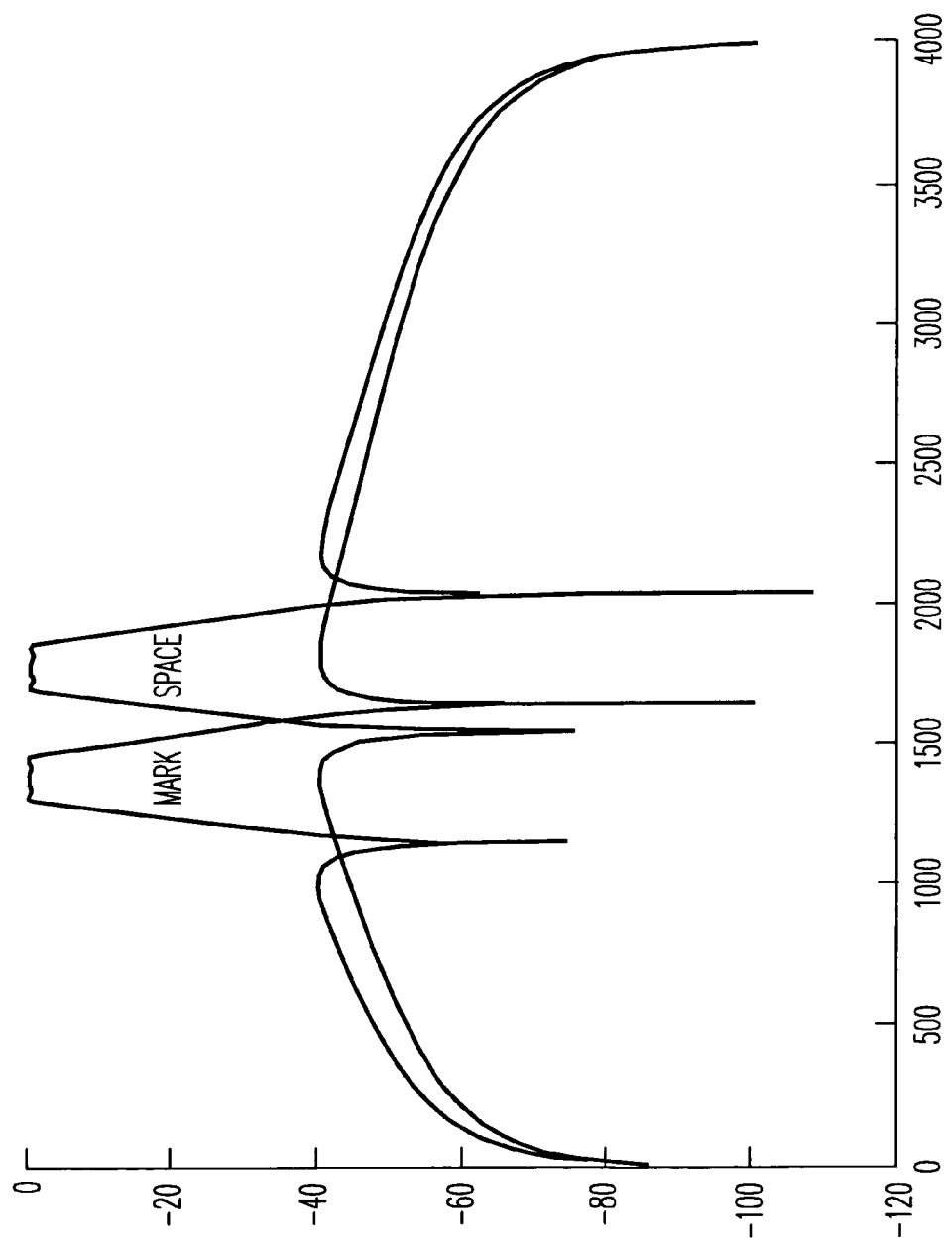
FIG. 5 is a plot showing the frequency response of the MARK bandpass filter and the SPACE bandpass filter, according to one embodiment of the invention.
Figure 6:
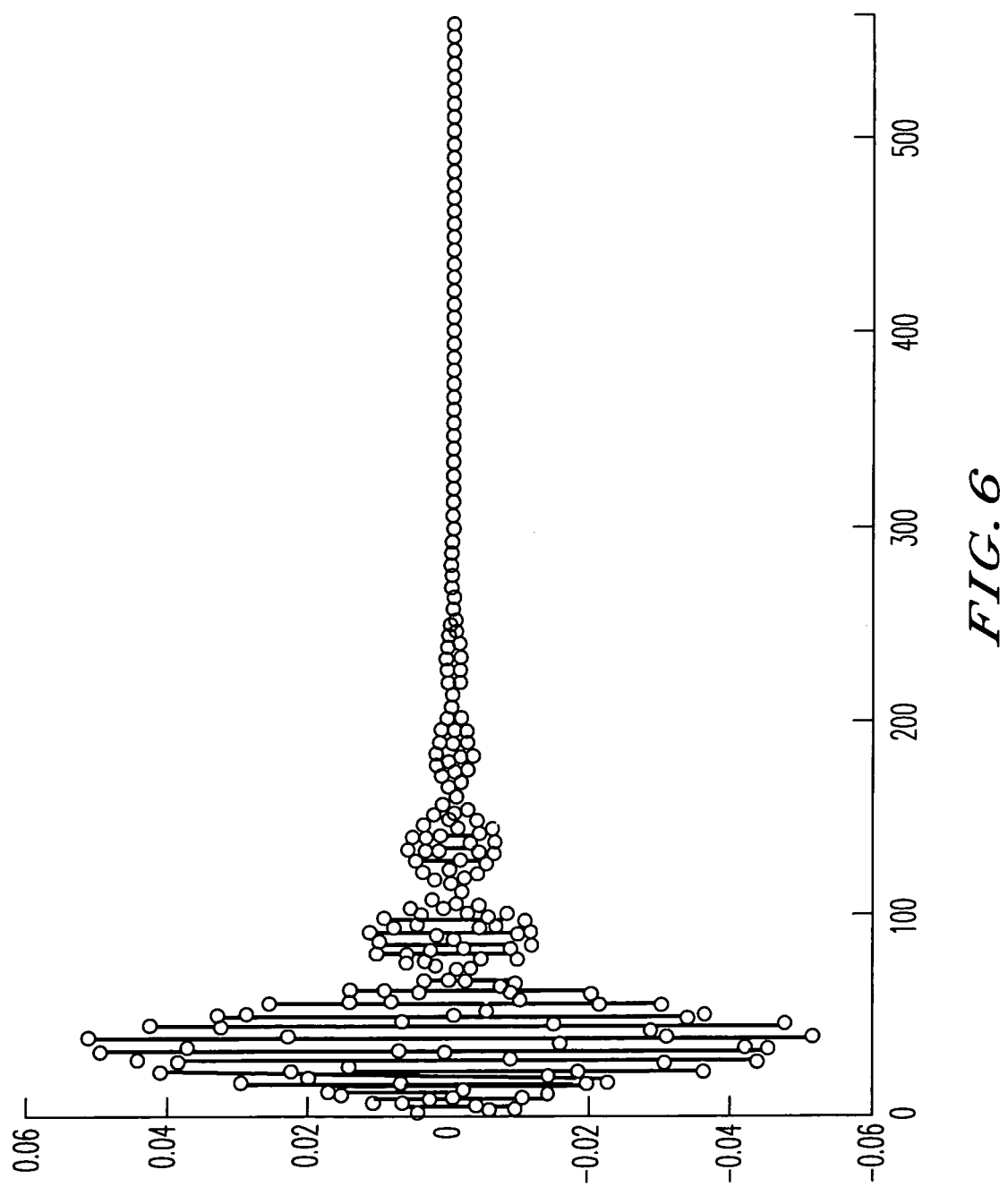
FIG. 6 is a plot showing the impulse response of the MARK bandpass filter, according to one embodiment of the invention.
Figure 7:
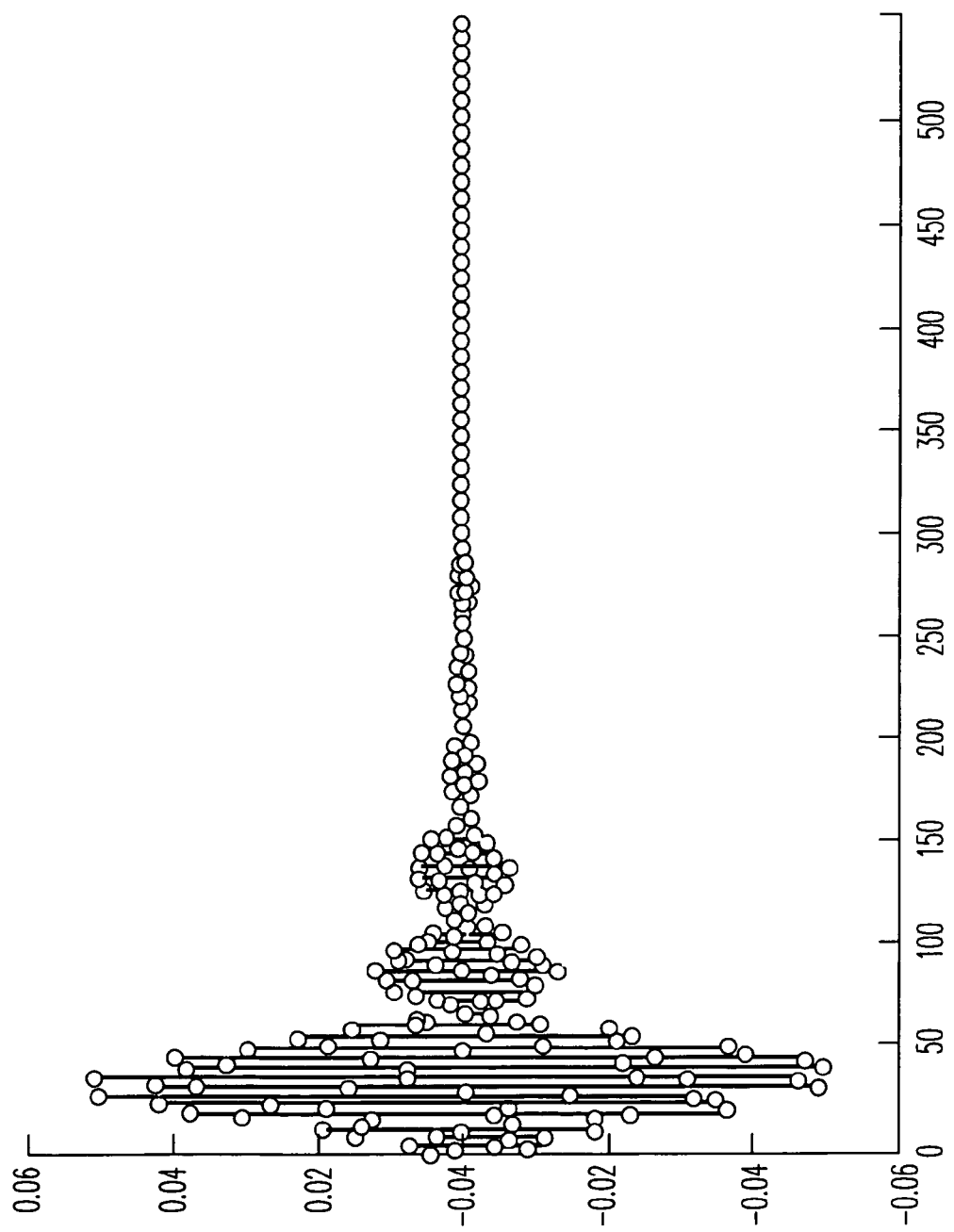
FIG. 7 is a plot showing the impulse response of the SPACE bandpass filter, according to one embodiment of the invention.

FIG. 4 is a schematic block diagram showing the MARK bandpass 401 and SPACE bandpass filter 402 of the TTY signal encoder 103. FIG. 5 is a frequency plot for the MARK bandpass filter 401 and the SPACE bandpass filter 402, according to one embodiment of the present invention. In this embodiment, the MARK bandpass filter is a sixth order bandpass elliptic filter with a center frequency of 1400 Hz, a passband ripple of 0.5 dB, and a stopband attenuation of 40 dB. The SPACE bandpass filter 402 in this embodiment is a sixth order bandpass elliptic filter with a center frequency of 1800 Hz, a passband ripple of 0.5 dB, and a stopband attenuation of 40 dB. FIG. 6 shows the impulse response of the MARK bandpass filter 401, and FIG. 7 shows the impulse response for the SPACE bandpass filter 402. As noted above, the output of the MARK bandpass filter is denoted $t_M[n]$, and the output of the SPACE bandpass filter is denoted $t_S[n]$. In this example, outputs $t_M[n]$ and $t_S[n]$ are assumed to be placed from n=40 to n=199 every frame.

Figure 8:
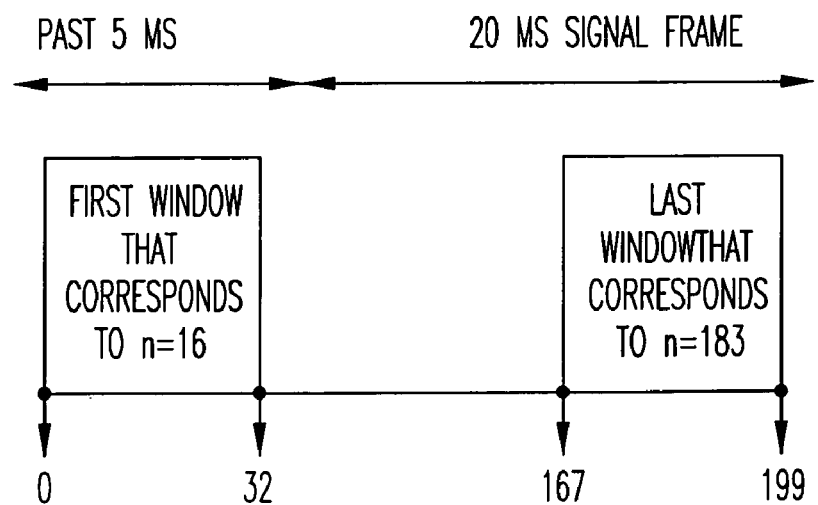
FIG. 8 is a diagram for explaining the windows used for computing energies in 20 millisecond signal frames, according to one embodiment of the invention.

FIG. 8 illustrates how the signals t[n], $t_M[n]$, and $t_S[n]$ are windowed to compute respective of local energies e[n], $e_M[n]$, and $e_S[n]$, according to one embodiment. The local energies of the input signal t[n] and the filtered signals $t_M[n]$ and $t_S[n]$ are computed using a rectangular window that spans 16 samples in both directions. FIG. 8 illustrates the windowing in every 20 millisecond frame.

The local energies of the input signal and the filtered signal are then computed using a rectangular window that spans 16 samples in either direction. FIG. 5 illustrates the windowing in every 20 ms frame. The local energies can be expressed as $$e[n] = \sum_{m=n-16}^{m=n+16} t^2[m]$$

$$e_M[n] = \sum_{m=n-16}^{m=n+16} t_M^2[m]$$

$$e_S[n] = \sum_{m=n-16}^{m=n+16} t_S^2[m]$$

where n ranges from 16 to 183. These energies are more efficiently computed for n=17 to n=183 using the following recursive relationships:

$$e[n] = e[n-1] - t^2[n-17] + t^2[n+16]$$
$$e_M[n] = e_M[n-1] - t_M^2[n-17] + t_M^2[n+16]$$
$$e_S[n] = e_S[n-1] - t_S^2[n-17] + t_S^2[n+16]$$

Figure 9A:
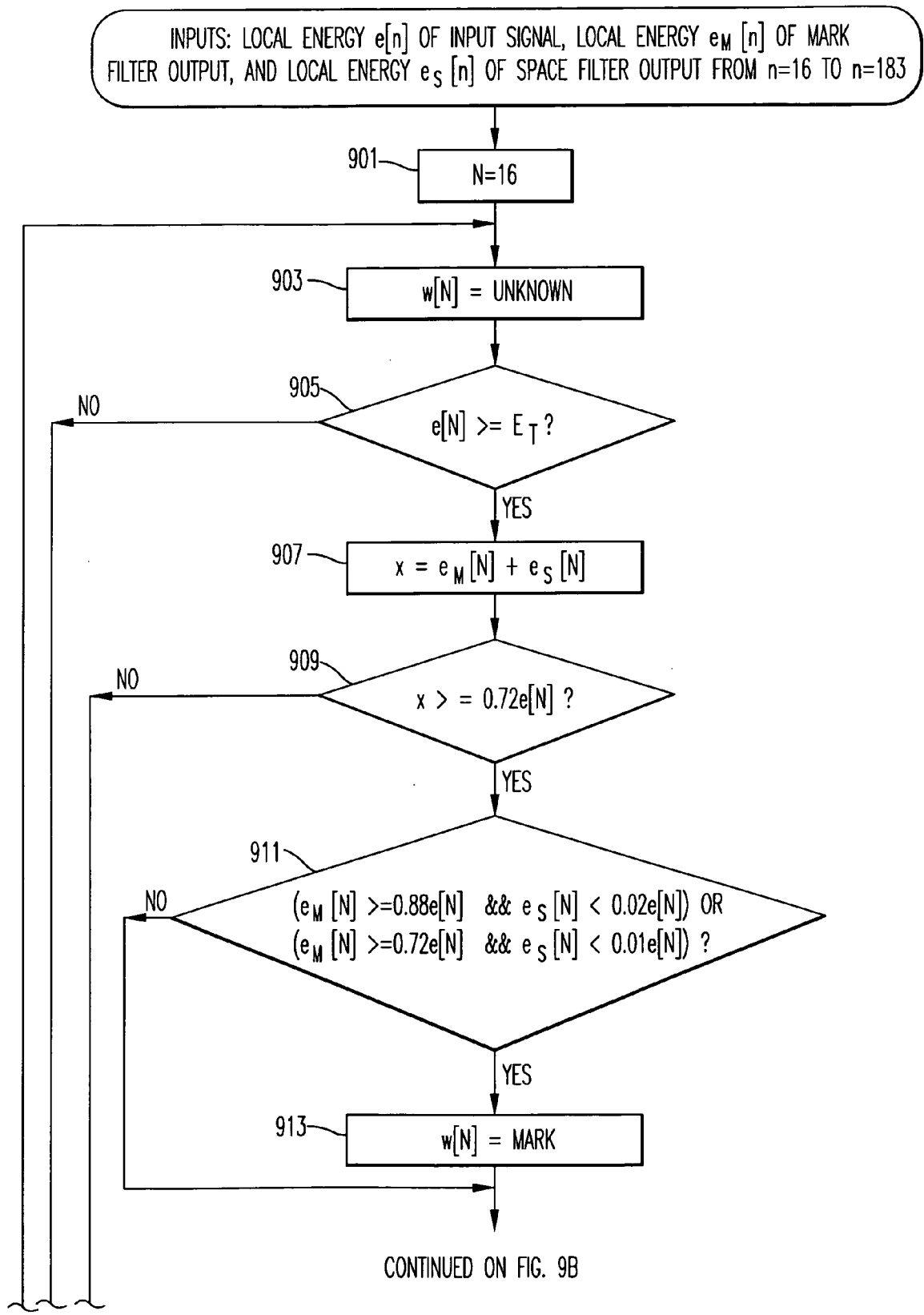
FIGS. 9A and 9B are a flowchart for explaining the generation of a raw TTY indicator signal, according to one embodiment of the invention.
Figure 9B:
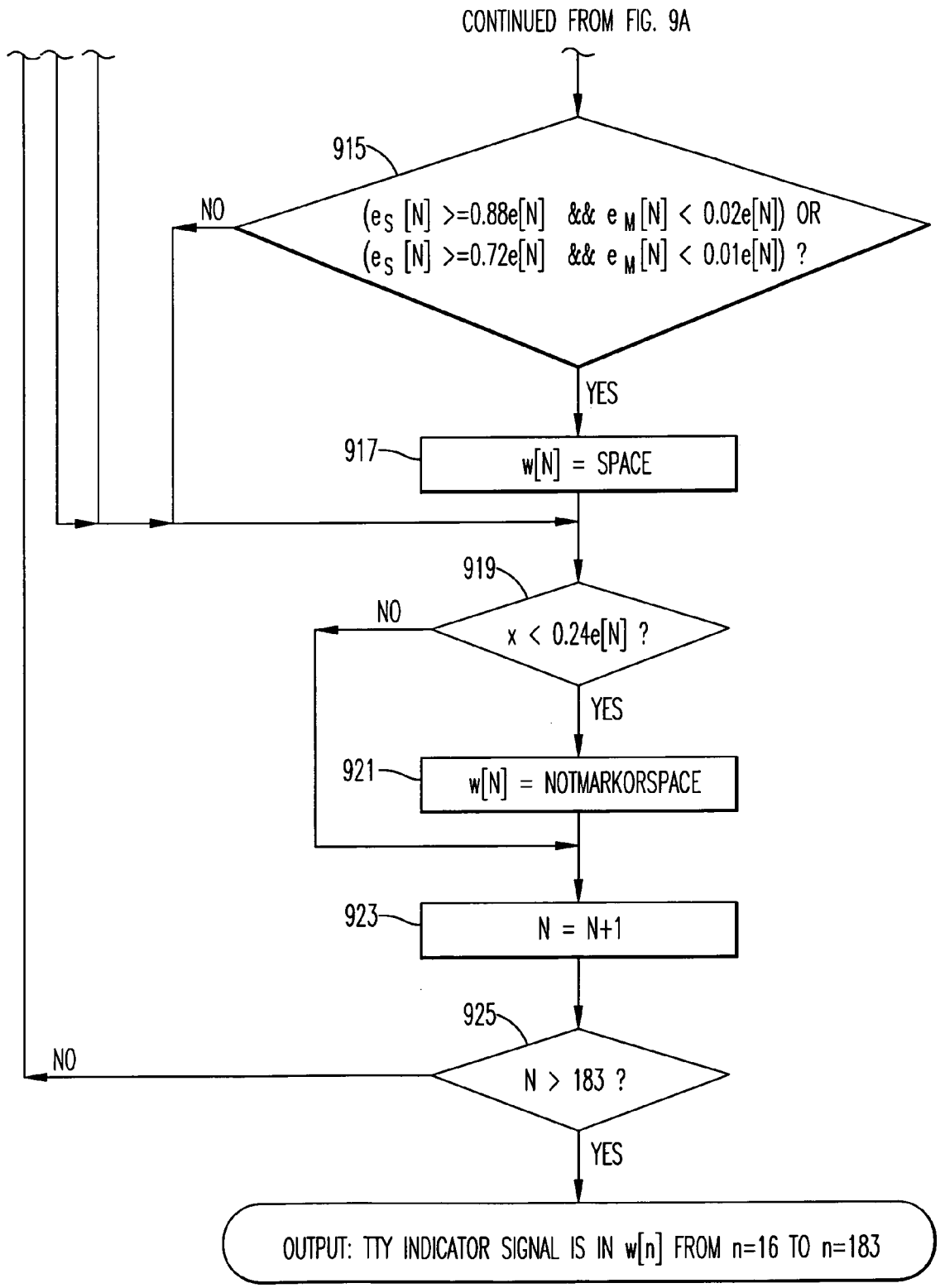

FIGS. 9A and 9B are a flowchart showing how the raw TTY indicator signal w[N] is generated according to one embodiment of the invention. The exemplary flowcharts of FIGS. 9A and 9B, w[N] is computed using the local energies e[N], $e_M[N]$, and $e_S[N]$, using fixed and relative threshholds from n=16 to n=183. In step 901, N is set equal to 16, and in step 903 w[N] is set equal to UNKNOWN. In step 905, the TTY signal encoder 103 determines whether e[N] is greater than or equal to a fixed threshhold, ET. ET is preferably set to a value resulting in an rms of between 100 db and 0 db below overload, and is most preferably equal to 281441.2425, which corresponds to a sample rms value of 93.75 or roughly 50 db below overload (i.e., approximately −50 dBov).

In step 907 a variable x is set equal to $e_M[N]$ plus $e_S[N]$. Then, in step 909 the TTY signal encoder 103 determines whether x is greater than or equal to 0.72e[N]. If x is greater than or equal to 0.72e[N], then in step 911 the TTY signal encoder 103 determines whether ($e_M[N]$ is greater than or equal to 0.88e[N] AND $e_S$[N] is greater than 0.02e[N]) OR (whether $e_M$[N] is greater than or equal to 0.72e[N] and whether $e_S$[N] is greater than 0.01e[N]. If this statement is true, then the process proceeds to step 913. If neither of the logic statements in step 911 are TRUE, then the process proceeds to step 915.

In step 913, the TTY indicator signal w[N] is assigned a value of MARK. In step 915 the TTY signal encoder 103 determines whether ($e_S$[N] is greater than or equal to 0.88e[N] AND $e_M$[N] is less than 0.02e[N]) OR ($e_S$[N] is greater than or equal to 0.72e[N] AND $e_M$[N] is less than 0.01 e[N]). If this statement is TRUE, then the process proceeds to step 917. In step 917 the TTY indicator signal w[N] is set equal to SPACE.

If the logic statement in steps 905, 909, or 915 are FALSE, then the process proceeds to step 919. In step 919 the TTY signal encoder 103 determines whether x is less than 0.24e[N]. If the logic statement in step 919 is TRUE, then the TTY indicator signal w[N] is set equal to NOTMARKORSPACE. Then the process proceeds to step 923, and N is incremented by 1. In step 919, if x is not less than 0.24e[N], then the process skips step 921 and proceeds to step 923.

In step 925 the TTY signal encoder 103 determines whether N is greater than 183. If N is greater than 183 then the TTY indicator signal w[N] has been computed for N=16 to N=183. If N is not greater than 183, then the process returns to step 903.

Figure 10A:
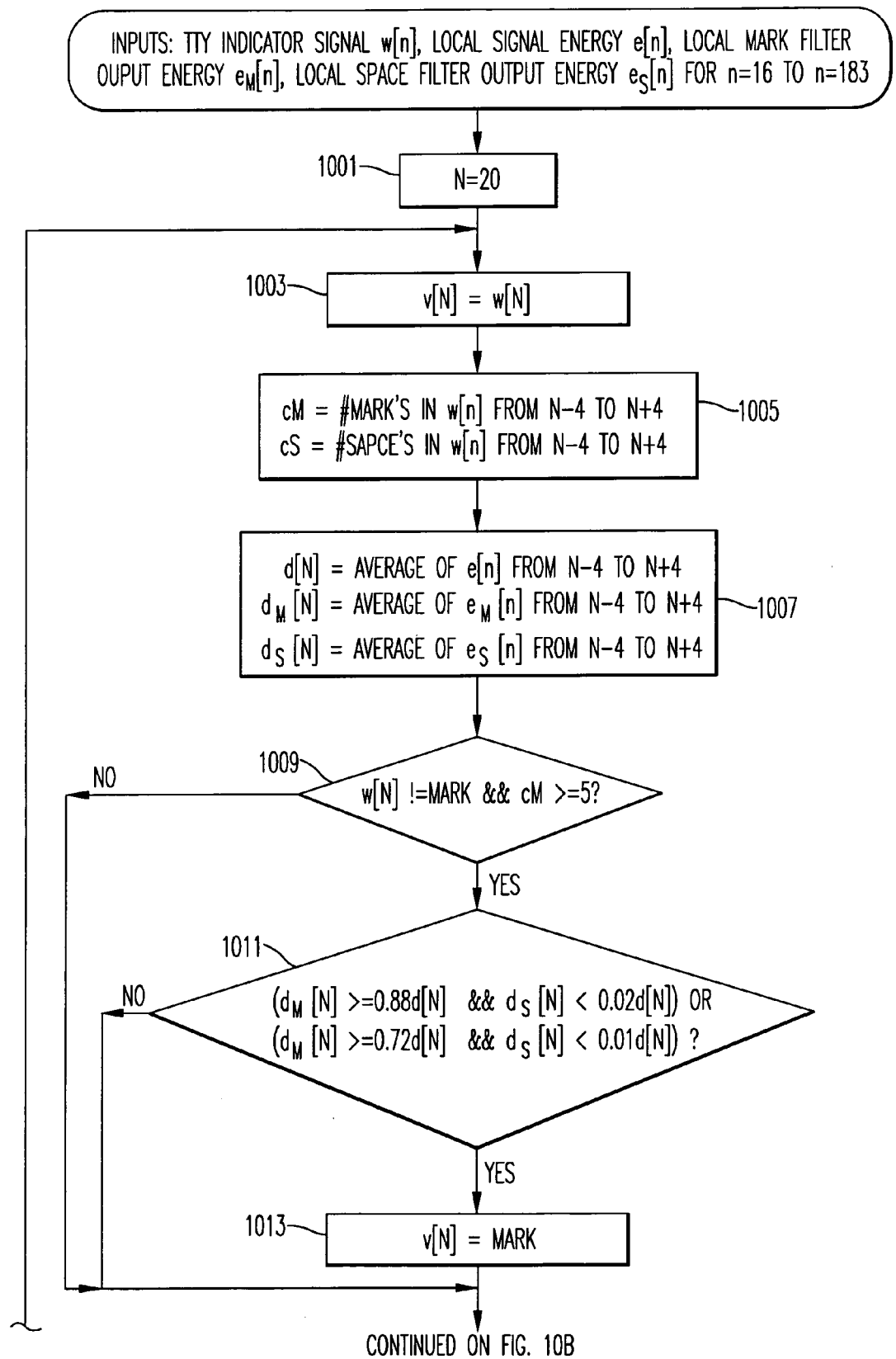
FIGS. 10A and 10B are a flowchart for explaining median filtering of a TTY indicator signal, according to one embodiment of the invention.
Figure 10B:
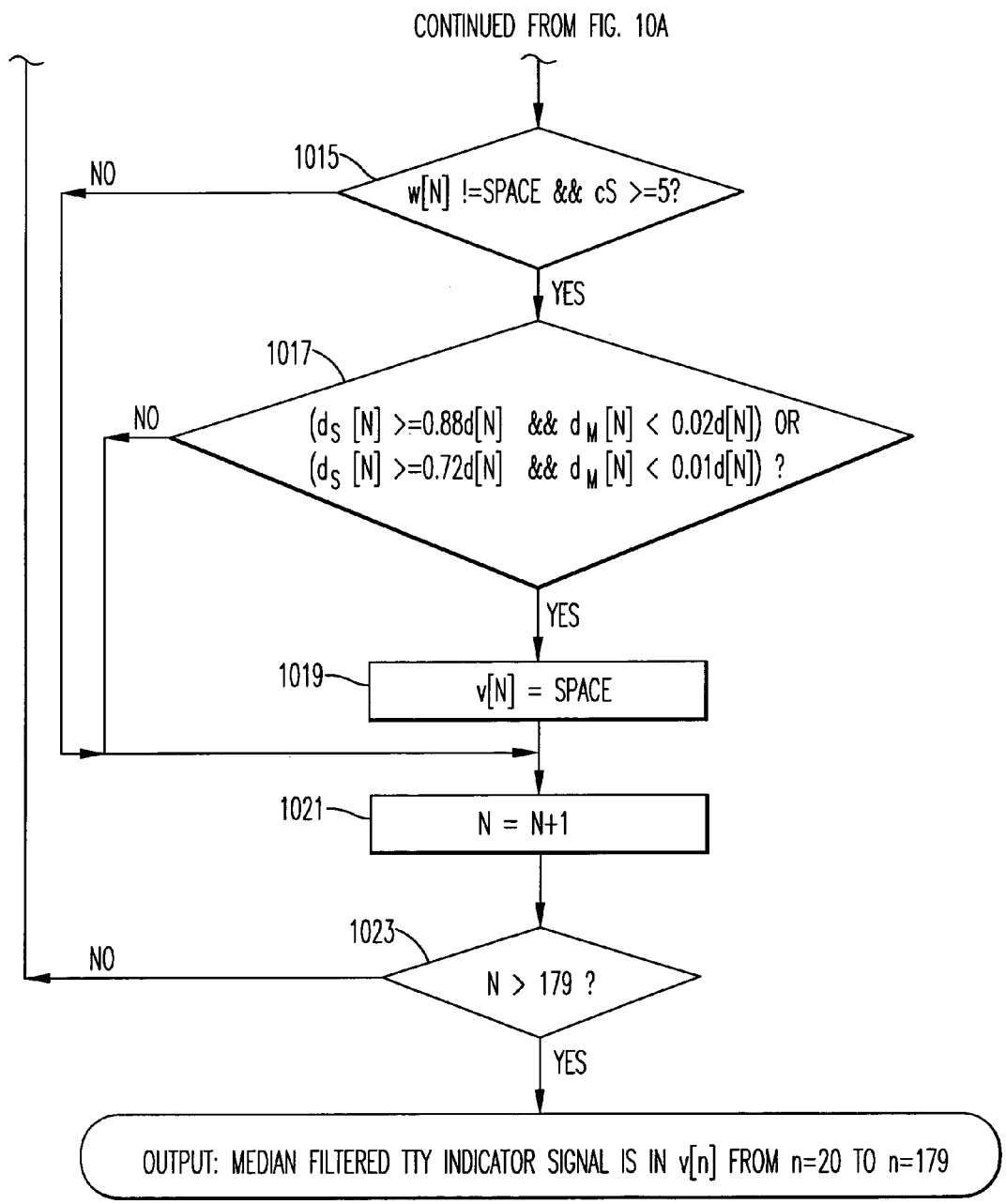

FIGS. 10A and 10B are a flowchart for explaining how the median filtered TTY indicator signal v[N] is generated from n=20 to n—179 in step 307 of FIG. 3, according to one embodiment of the invention. In step 1001, N is set equal to 20. Then, in step 1003 v[N] is set equal to w[N].

In step 1005 a MARK counter cM is set equal to the number of MARKs in w[n] from N−4 to N+4 and a SPACE counter, $c_S$ is set equal to the number of SPACEs in w[n] from N−4 to N+4.

In step 1007 d[N] is set equal to the average of e[n] from N−4 to N+4, dM[N] is set equal to the average of $e_M$[n] from N−4 to N+4, and $d_S$[N] is set equal to the average of $e_S$[n] from N−4 to N+4.

Then, in step 1009 the TTY signal encoder 103 determines whether (w[N] is not equal to MARK) AND ($c_M$ is greater than or equal to 5). If this statement is TRUE, then the process proceeds to step 1011, otherwise the process proceeds to step 1015.

In step 1011 the TTY signal encoder 103 determines whether (dM[N] is greater than or equal to 0.88d[N] AND $d_S$[N] is less than 0.02d[N]) OR (dM[N] is greater than or equal to 0.72d[N] AND $d_S$[N] is less than 0.01d[N]). If this statement is TRUE, then the process proceed to step 1013, otherwise the process proceeds to step 1015.

In step 1013 v[N] is set equal to MARK. Then, the process proceeds to step 1015.

In step 1015 the TTY signal encoder 103 determines whether (w[N] is not equal to SPACE) AND ($c_S$ is greater than or equal to 5). If this statement is TRUE, then the process proceeds to step 1017, otherwise the process proceeds to step 1021.

In step 1017 the TTY signal encoder 103 determines whether ($d_S$[N] is greater than or equal to 0.88 d[N] AND dM[N] is less than 0.02 d[N]) OR ($d_S$[N] is greater than or equal to 0.72 d[N] AND dM[N] is less than 0.01 d[N]). If this statement is TRUE, then the process proceeds to step 1019, otherwise the process proceeds to step 1021.

In step 1019, v[N] is set equal to SPACE. Then, the process proceeds to step 1021.

In step 1021 N is incremented by 1. Then the process proceeds to step 1023.

In step 1023 the TTY signal encoder 103 determines whether N is greater than 179. If N is greater than 179, then median filtering of the raw TTY indicator signal w[N] is complete, and the median filtered TTY indicator signal v[N] has been calculated from N=20 to N=179. If, in step 1023 N is not greater than 179, then the process returns to step 1003.

Figure 11A:
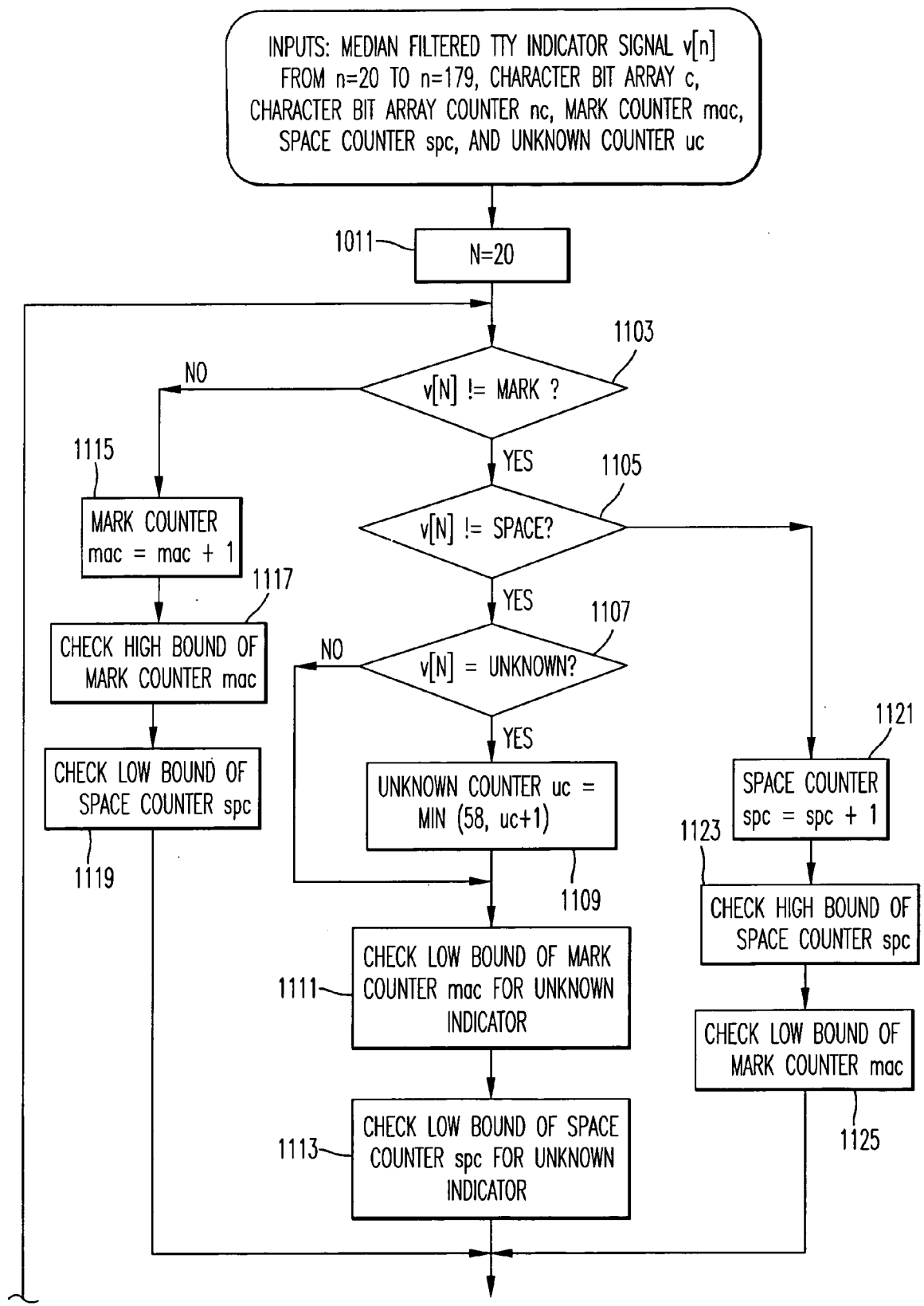
FIGS. 11A and 11B are a flowchart for explaining detection of a new TTY character bit, according to one embodiment of the invention.
Figure 11B:
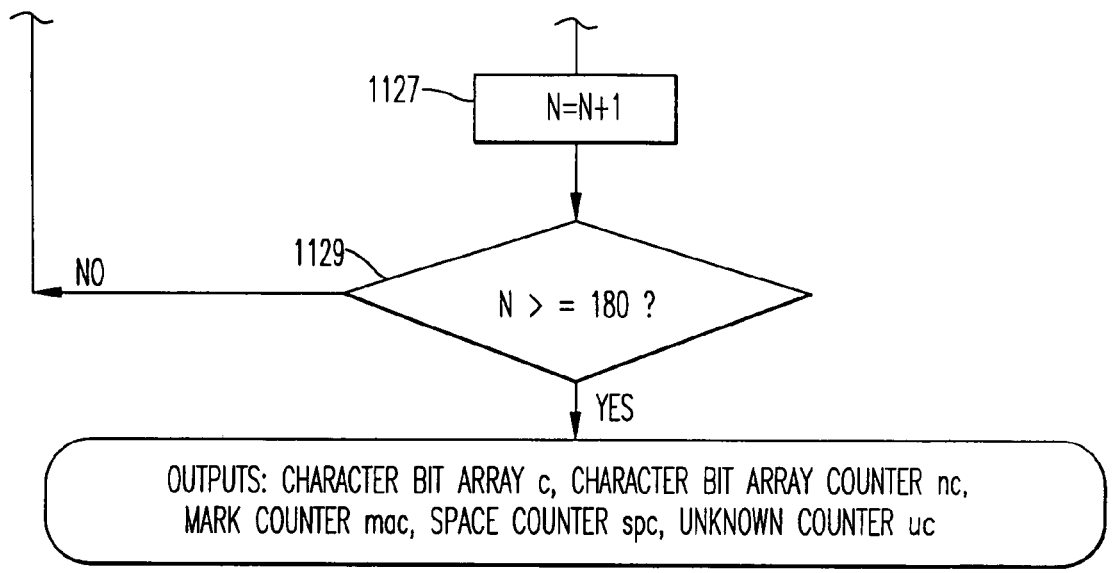

The median filtered TTY indicator signal, v[N] also referred to as simply the TTY indicator signal, is used for detecting a new TTY character bit and for updating the TTY character bit array. FIGS. 11A and 11B are flowcharts for explaining how new TTY character bits are detected and updated in step 205 of FIG. 2, according to one embodiment of the invention.

Referring to FIGS. 11A and 11B, in step 1101 N is set equal to 20, then in step 1103 the TTY signal encoder 103 determines whether v[N] is not equal to MARK. If v[N] is not equal to MARK, then the process proceeds to step 1105, otherwise the process proceeds to step 1115.

In step 1105 the TTY signal encoder 103 determines whether v[N] is not equal to SPACE. If v[N] is not equal to SPACE, then the process proceeds to step 1107, otherwise the process proceeds to step 1121.

In step 1107 the TTY signal encoder 103 determines whether v[N] is equal to UNKNOWN. If v[N] is equal to unknown, then the process proceeds to step 1109, otherwise the process proceeds to step 1111.

In step 1109 an UNKNOWN counter uc is set equal to the minimum of 58 and uc+1. Then the process proceeds to step 1111.

In step 1111 the TTY signal encoder 103 checks the low bound of a MARK counter, mac, for an unknown indicator. Then, in step 1113 the TTY signal encoder 103 checks the low bound of a SPACE counter spc for an unknown indicator. steps 1111 and 1113 are described below in greater detail with respect to FIG. 14.

Referring back to step 1115, in step 1115 the MARK counter, mac, is incremented by 1. Then, in step 1117, the TTY signal encoder 103 checks the high bound of the MARK counter, mac. Then, in step 1119 the TTY signal encoder 103 checks the low bound of the SPACE counter, spc. Step 1117 is described below in greater detail with respect to FIG. 12, and step 1119 is described in greater detail below with respect to FIG. 13.

Referring back to step 1121, in step 1121 the TTY signal encoder 103 increments the SPACE counter, spc, by 1. Then, in step 1123 the TTY signal encoder 103 checks the high bound of the SPACE counter, spc. Then, in step 1125 the TTY signal encoder 103 checks the low bound of the MARK counter, mac. Steps 1123 and 1125 are described in greater detail below with respect to FIGS. 12 and 13, respectively.

After step 1113, 1119, or 1125, the process proceeds to step 1127. In step 1127 N is incremented by 1. Then, in step 1129, the TTY signal encoder 103 determines whether N is greater than or equal to 180. If N is greater than or equal to 180, then the deduction of any new TTY character bit and the update of the TTY character bit array, c, is complete, otherwise the process returns to step 1103.

Figure 12:
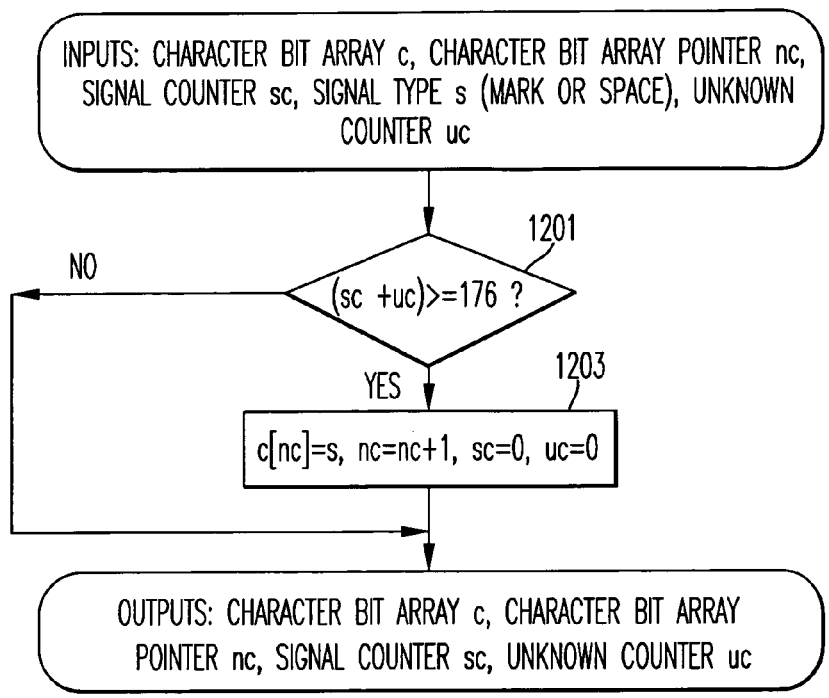
FIG. 12 is a flowchart for explaining how the high bound of a signal counter is checked, according to one embodiment of the invention.

FIG. 12 is a flowchart for explaining how the high bound of the MARK counter, mac, and the SPACE counter, spc, is checked in respective of steps 1117 and 1123. In step 1201 the TTY signal encoder 103 determines whether the signal counter, sc, plus the unknown counter, uc, is greater than or equal to 176. If sc+uc is greater than or equal to 176, then the process proceeds to step 1203. Note that sc is the same as mac in step 1117 and the same as spc in step 1123.

In step 1203, the character bit array, c, the character bit array pointer, nc, the signal counter, sc, and the unknown counter, uc, are set. Specifically, c[nc] the set equal to s, nc is incremented by 1, sc is set equal to 0, and uc is set equal to 0. The signal type, s, has a value of either MARK or SPACE. The value of s is MARK in step 1117 and SPACE in step 1123.

Figure 13:
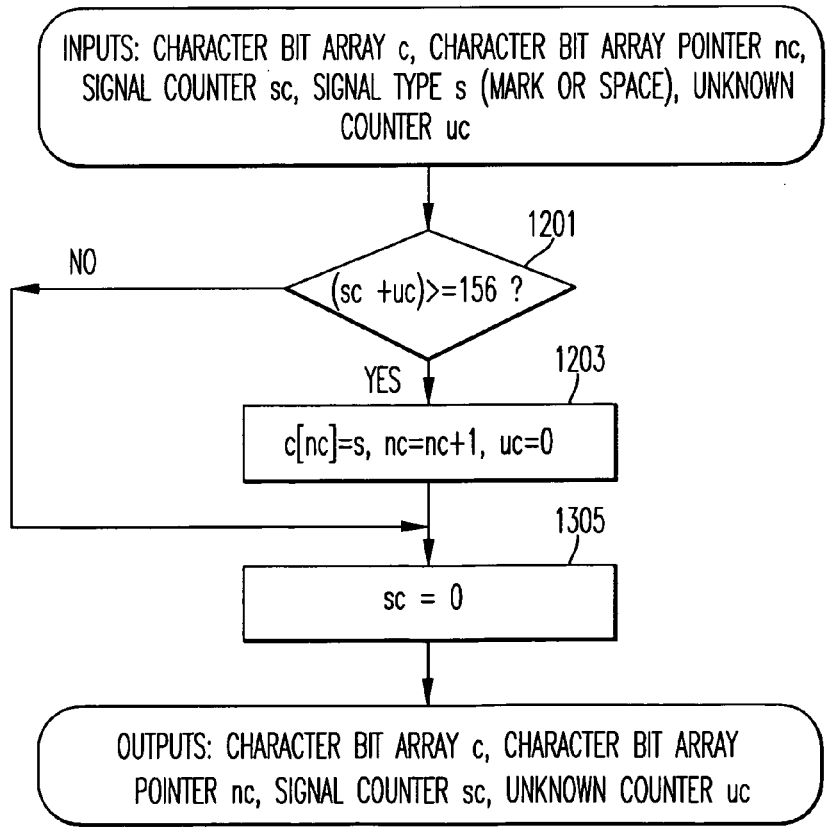
FIG. 13 is a flowchart for explaining how a low bound of a signal counter is checked, according to one embodiment of the invention.

FIG. 13 is a flowchart for explaining how the TTY signal encoder 103 checks the low bound of the SPACE SPACE counter spc and the low bound of the MARK counter, mac, in respective of steps 1119 and 1125. In step 1301 the TTY signal encoder 103 determines whether the signal counter, sc plus the unknown counter, uc, is greater than or equal to 156. If sc+uc is greater than or equal to 156, then the process proceeds to step 1303, otherwise the process proceeds to step 1305. Again, note that sc is the same as mac in step 1119 and the same as spc in step 1125.

In step 1303 the character bit array, c, the character bit array pointer, nc, and the unknown counter, uc, are adjusted. Specifically, c[nc] is set equal to s, nc is incremented by 1, and uc is set equal to 0. The value of s is MARK in step 1119 and SPACE in step 1125.

In step 1305 the signal counter, sc, is set equal to 0.

Figure 14:
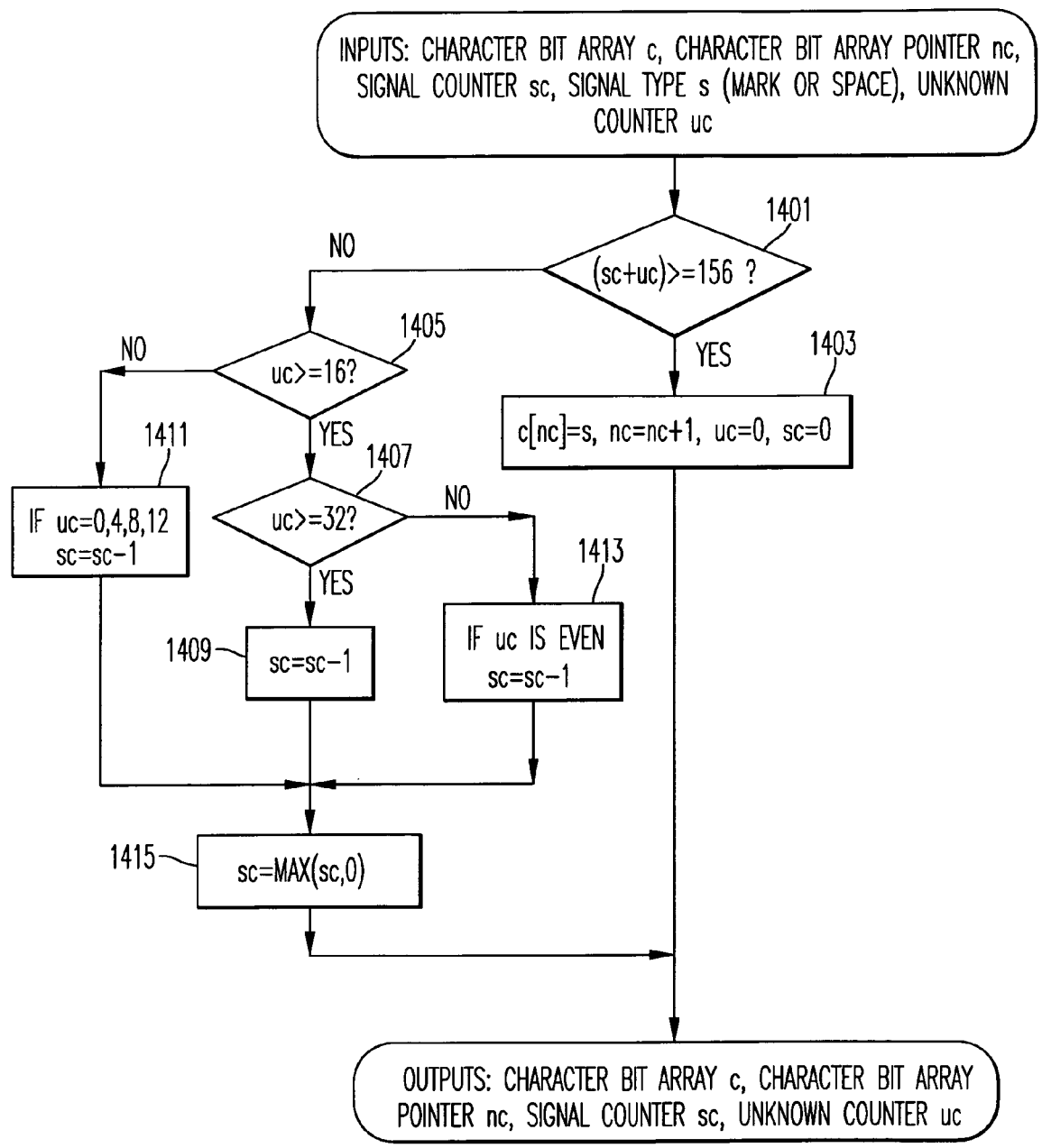
FIG. 14 is a flowchart for explaining how a low bound of a signal counter for an unknown indicator is checked, according to one embodiment of the invention.

FIG. 14 is a flowchart for explaining how the low bound of the MARK counter in step 1111, mac, or the SPACE counter, spc, is checked for the unknown indicator in step 1113. In step 1401, the TTY signal encoder 103 determines whether the signal counter, sc, plus the unknown counter, uc, is greater than or equal to 156. If sc plus uc is greater than or equal to 156, then the process proceeds to step 1403, otherwise the process proceeds to step 1405. In step 1403 the values of the character bit array, c, the character bit array pointer, nc, the signal counter, Sc, and the unknown counter, uc, are adjusted. Specifically, c[nc] is set equal to s, nc is incremented by 1, uc is set equal to 0, and sc is set equal to 0. Again, note that sc is the same as mac in step 1111, and s is equal to MARK, in step 1111. In step 1113, sc is the same as spc, and s is equal to SPACE.

In step 1405, the TTY signal encoder 103 determines whether uc is greater than or equal to 16. If uc is greater than or equal to 16, then the process proceeds to step 1407, otherwise the process proceeds to step 1411.

In step 1407, the TTY signal encoder 103 determines whether uc is greater than or equal to 32. If uc is greater than or equal to 32, then the process proceeds to step 1409, otherwise the process proceeds to step 1413.

In step 1409, the signal counter, sc, is decremented by 1. Then, the process proceeds to step 1415.

In step 1411, the TTY signal encoder 103 decrements the signal counter, sc, by 1 if the unknown counter, uc, is equal to 0, 4, 8, or 12. Then, the process proceeds to step 1415.

In step 1413, the TTY signal encoder decrements the signal counter, sc, by 1 if the unknown counter, uc, is even. Then, the process proceeds to step 1415.

In step 1415, the signal counter, sc, is set equal to the greater of the signal counter, sc, and 0.

Figure 15:
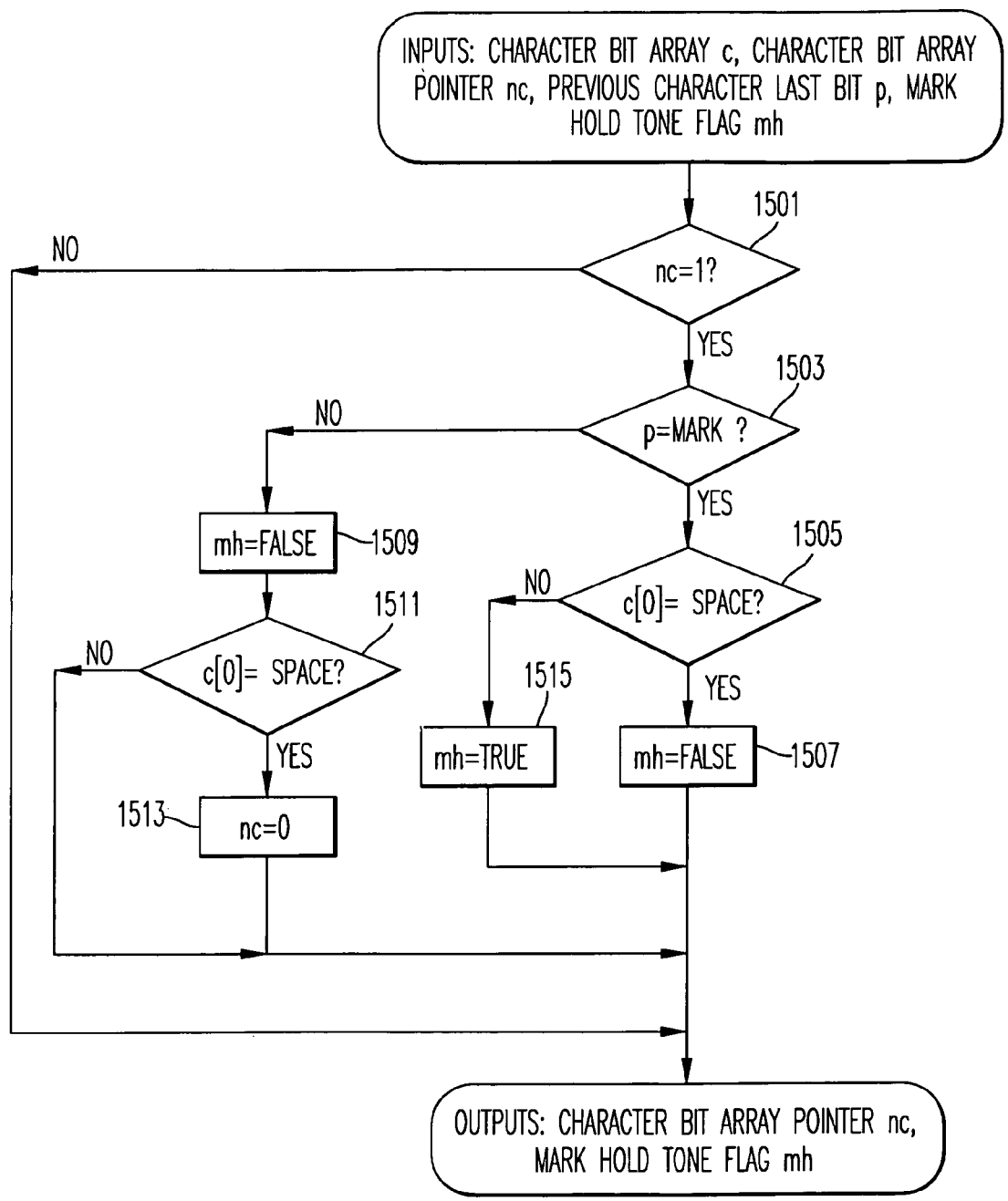
FIG. 15 is a flowchart for explaining how a start character bit is validated, according to one embodiment of the invention.

FIG. 15 is a flowchart for explaining how the start character bit is validated in step 207 of FIG. 2. In step 1501 the TTY signal encoder 103 determines whether the character bit array pointer, nc, is equal to 1. If nc is equal to 1, then the process proceeds to step 1503. In step 1503 the TTY signal encoder 103 determines whether the previous character last bit, p, is equal to MARK. As shown in Table 1, the last bit of TTY character is a mark hold tone, according to this embodiment of the invention. If p is equal to MARK, then the process proceeds to step 1505, otherwise the process proceeds to step 1509.

In step 1505, TTY signal encoder 1033 determines whether the first bit in the character bit array, c[0], is equal to SPACE. As shown in Table 1, the start bit for a 5-bit TTY character is encoded as SPACE, according to this embodiment of the invention. If c[0] is equal to SPACE, then the process proceeds to step 1507, otherwise the process proceeds to step 1515.

In step 1507 the MARK hold tone flag, mh, is set equal to FALSE. In step 1515, the MARK hold tone flag, mh, is set equal to TRUE.

Referring back to step 1509, in step 1509 the MARK hold tone, mh, is set equal to FALSE. Then, in step 1511 the TTY signal encoder 103 determines whether c[0] is equal to MARK. If c[0] is equal to MARK, then in step 1513 nc is set equal to 0. Accordingly, it can be seen that the procedure described in FIG. 15 verifies the start bit to be a SPACE, otherwise the MARK hold tone indicator flag, mh, is set to TRUE.

FIG. 16 is a flowchart for explaining how the TTY signal encoder 103 validates the n bits of a character bit array. In step 1601 TTY signal encoder 103 determines whether the character bit array pointer, nc, is greater than or equal to 8. If, nc is greater than or equal to 8, then the process proceeds to step 1603.

In step 1603 TTY signal encoder 103 determines whether the sixth bit in the character bit array, c[6], is equal to MARK. If c[6] is equal to MARK, then the process process proceeds to step 1605, otherwise the process proceeds to step 1621 in which nc is set equal to zero.

In step 1605 the last bit of the previous character, p, is set equal to MARK. Then, the process proceeds to step 1607.

In step 1607 TTY signal encoder 103 determines whether the seventh bit of the character bit array, c[7], is equal to MARK. If c[7] is equal to MARK, then the process proceeds to step 1609, otherwise the process proceeds to step 1613.

In step 1609 TTY signal encoder 103 sets TTY flag equal to TRUE and sets the TTY character bit length, L, equal to 8.

Next, in step 1611, TTY signal encoder 103 determines whether the character bit array pointer, nc, is equal to 9. If nc is equal to 9, then the process proceeds to step 1617, otherwise the process proceeds to step 1623.

In step 1617, TTY signal encoder sets the zero bit of the character array, c[0], equal to the eighth bit of the character bit array, c[8]. Also, in step 1617 the character bit array pointer, nc, is set equal to 1.

In step 1623, the character bit array pointer nc, is set equal to 0.

Referring back to step 1613, in step 1613 TTY flag is set equal to TRUE, and the TTY character bit length, L, is set equal to 7.

In step 1615, TTY signal encoder 103 determines whether the character bit array pointer, nc, is equal to 9. If nc is equal to 9, then the process proceeds to step 1619, otherwise the process proceeds to step 1617.

In step 1619, TTY signal encoder 103 sets the zero bit of the character bit array, c[0] equal to the seventh bit of the character bit array, c[7]. The TTY signal encoder 103 also sets the first bit of the character bit array, c[1], equal to the eighth bit of the character bit array, c[8], and sets the character bit array pointer, nc, equal to 2.

Accordingly, it can be seen that the process described in FIG. 16 verifies the end bits of the character bit array to be 1 or 2 MARK bits.

FIG. 17 is a flowchart for explaining how the MARK hold tone of the character bit array is validated. In step 1701 TTY signal encoder 103 determines whether the MARK hold tone flag, mh, is equal to TRUE AND the character bit array, nc, is greater than 1. If mh= TRUE and nc>1, then the process proceeds to step 1703.

In step 1703 TTY signal encoder 103 determines whether the $(nc-1)^{th}$ bit in the character bit array, c[nc−1], is not equal to MARK. If c[nc−1] is not equal to MARK, then the process proceeds to step 1705.

In step 1705 TTY signal encoder sets mh equal to FALSE, sets c[0] equal to c[nc−1], and sets nc equal to 1.

Accordingly, the process described in FIG. 17 performs MARK hold tone validation by verifying all bits to be MARKs if the MARK hold tone flag, mh, is set to be TRUE. It is to be noted that the determination in step 1601 will fail without the start bit being validated in FIG. 15. Thus, the process of FIG. 15 indirectly influences the value of TTY-flag.

Accordingly, after step 205 in FIG. 2, the MARK counter, mac, is incremented if the signal v[n] indicates a MARK, and the high bound of the MARK counter, mac, and the low bound of the SPACE counter, spc, is checked using the procedures described in FIGS. 11–13. Similarly, the SPACE counter, spc, is incremented if the signal v[n] indicates a SPACE, and the high bound of the SPACE counter, spc, and the low bound of the MARK counter, mac, are checked using the procedures in FIGS. 12 and 13, respectively. If the signal v[n] indicates UNKNOWN, then the UNKNOWN counter, uc, is incremented, but clamped, and the low bound of both the MARK and SPACE counters are checked using the procedure described in FIG. 14. Accordingly, the flow-charts in FIGS. 12–14 update the character bit array, c, by checking the MARK or SPACE counters against thresholds that are related to the bit duration length and the transient effects of the MARK bandpass filter 401 and the SPACE bandpass filter 402.

Figure 18:
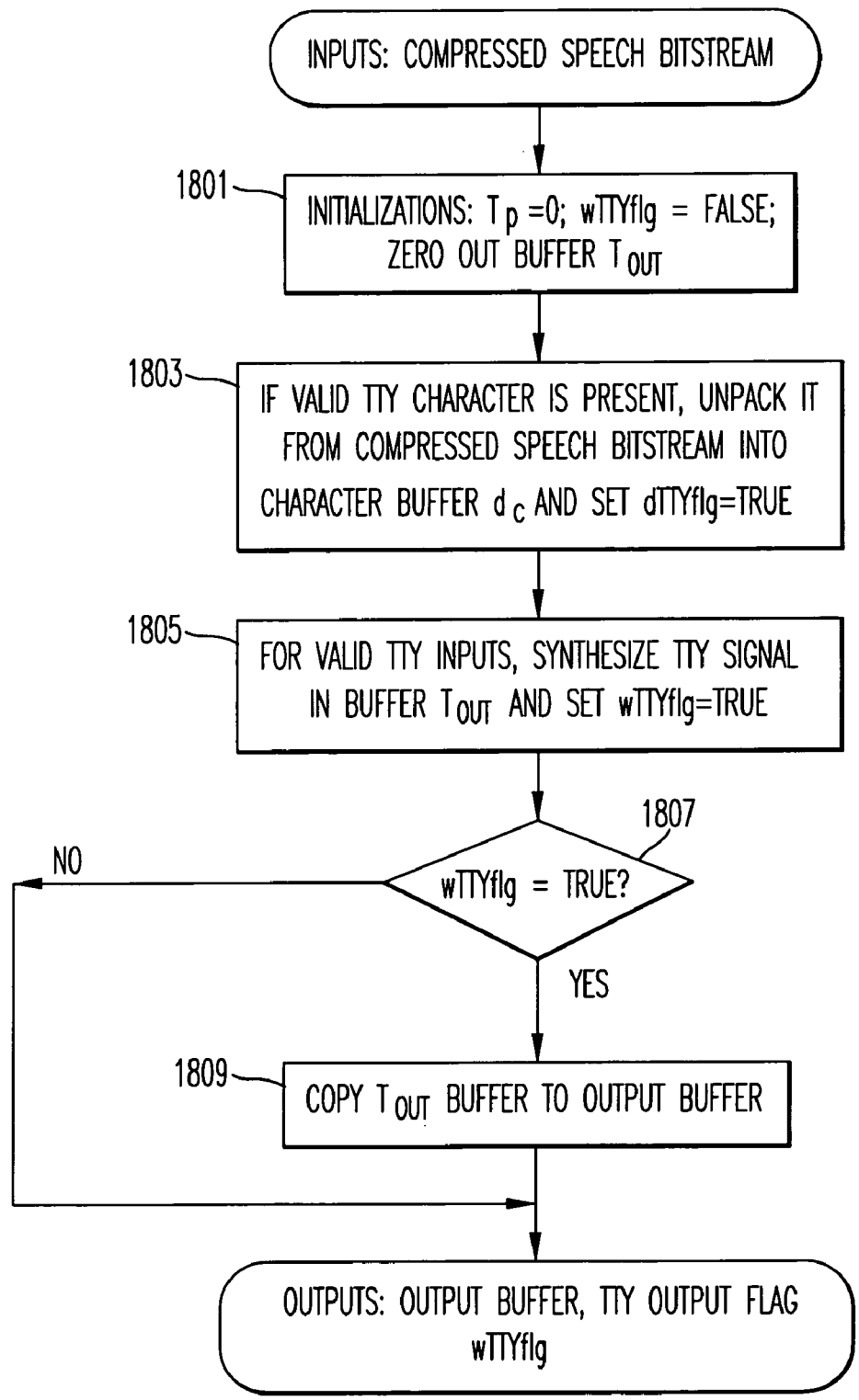
FIG. 18 is a flowchart for explaining the operation of a TTY signal decoder, according to one embodiment of the invention.

A completely validated TTY character bit array results in TTYflag, which is initialized to FALSE, being set to TRUE in step 207. Thus, the start character bits, the end character bits, and the MARK hold tone all have to be validated in step 207 for TTYflag to be equal to TRUE. As explained earlier, when TTYflag is set to TRUE, the TTY signal encoder 103 constructs a special TTY packet, which is then used to overwrite the compressed speech packet for that frame followed by repetition for the next 7 frames and transmission of zero packets for the subsequent 1 frame, as set forth in steps 209–225 in FIG. 2. FIG. 18 is a flowchart providing an overview of how the TTY signal decoder 113 decodes the signal received via channel 109 from the transmit side of the system of FIG. 1. In step 1801 the TTY signal buffer, $T_{out}$, is zeroed out, the pointer for the TTY signal buffer, $T_p$, is set to 0, and the TTY output flag, wTTYflg, is set to FALSE at the beginning of every frame.

Next, in step 1803 the TTY signal decoder 113 determines whether the received compressed speech packet is a valid TTY packet. According to one embodiment of the invention, a valid TTY packet is declared if the TTY header is valid, the Hamming weight of the remaining bits (i.e., from bit 13 onwards) is 0, and the bad frame indicator indicates a good received packet. A valid TTY packet is indicated by setting the control flag dTTYflg equal to TRUE, otherwise the control flag dTTYflg is equal to FALSE. Also, in step 1803 if a valid TTY character is present, it is unpacked from the compressed speech bit stream into character buffer dc.

Then, in step 1805 for valid TTY inputs the TTY signal is synthesized as long as valid TTY characters are present, using the elastic buffer management procedure described in further detail below with reference to FIGS. 19A and 19B.

Specifically, the TTY signal decoder 113 synthesizes the TTY signal in the TTY signal buffer, $T_{out}$ In step 1807 the TTY signal decoder 113 determines whether wTTYflg is equal to TRUE. If wTTYflg is equal to TRUE, then the process proceeds to step 1809. In step 1809, the TTY signal decoder 113 copies the TTY signal buffer $T_{out}$ to the output buffer. If there are no valid TTY characters in the character buffers, then no TTY signal is synthesized, and the control flag wTTYflg is set equal to FALSE.

Figure 19A:
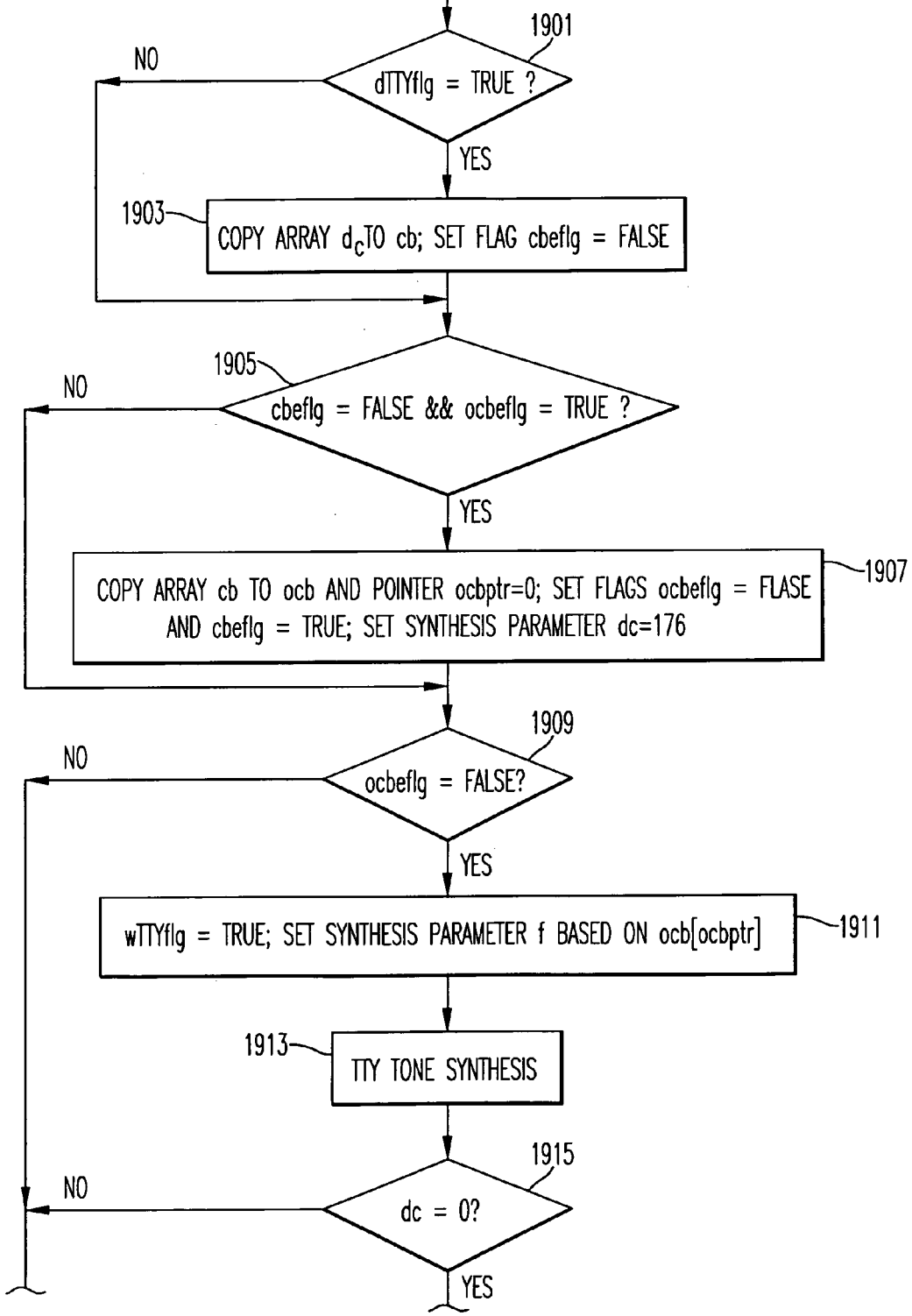
FIGS. 19A and 19B are a flowchart for explaining TTY tone synthesis, according to one embodiment of the invention.
Figure 19B:
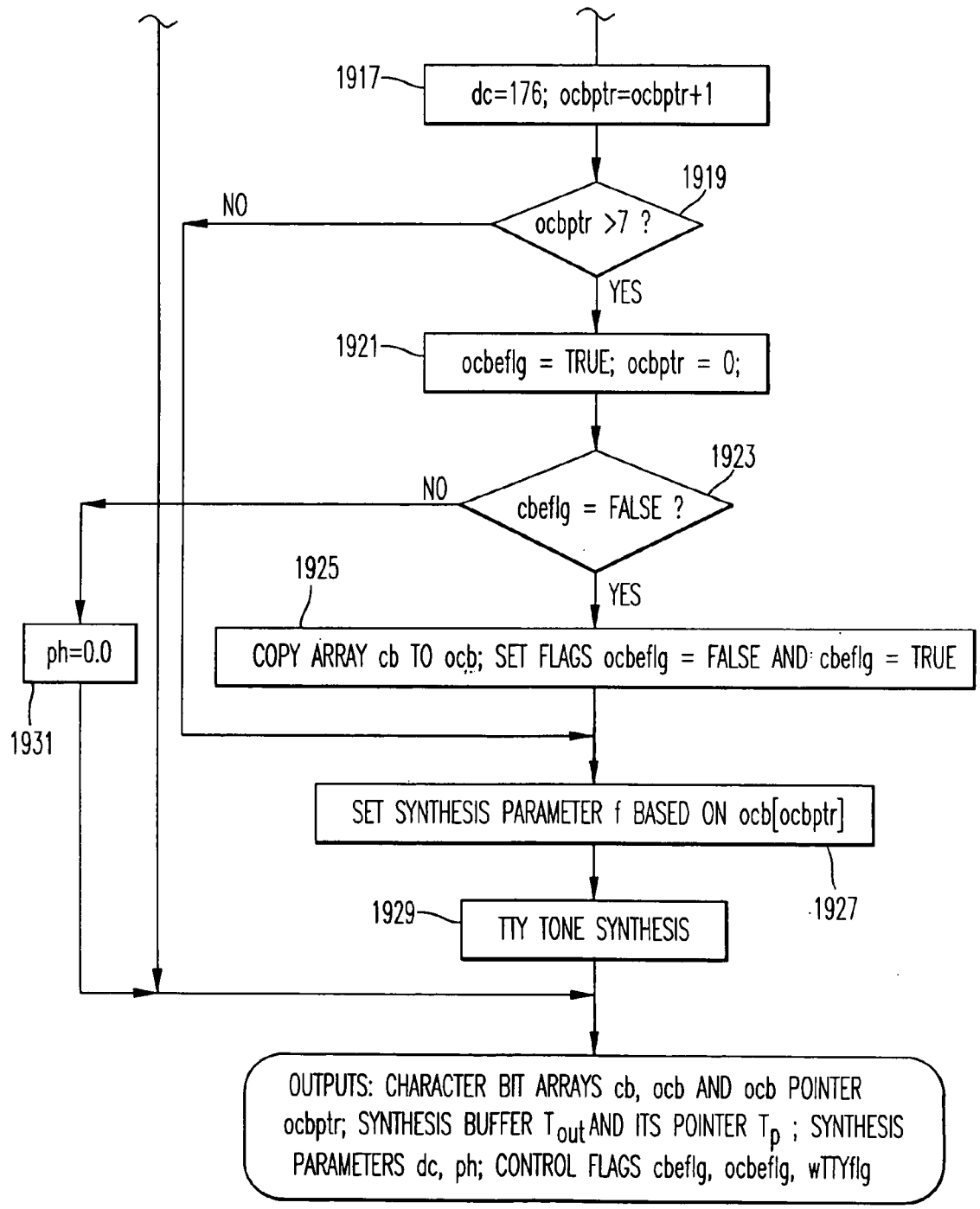

FIGS. 19A and 19B are a flowchart for explaining TTY tone synthesis, using elastic buffer management. Elastic buffer management is used in this example because of the asynchronous mode of the TTY signal, its detection, and transmission. The elastic buffer management procedure used in FIGS. 19A and 19B uses two character buffers, denoted cb and ocb, with buffer empty flags cbeflg and ocbeflg, respectively. The buffer cb is used to store the most recent received valid TTY character bits, and once the buffer cb is filled, the associated buffer empty flag, cbeflg, is set to FALSE. The contents of the buffer cb are transferred to the working character buffer ocb when the buffer empty flag for the working character buffer, ocbflg, is TRUE. Once this transfer is accomplished, the buffer empty flag of the buffer cb, cbeflg, is set to TRUE again. As long as the buffer empty flag of the working character buffer ocb, ocbeflg, is FALSE, there is a valid TTY signal that remains to be synthesized. This is indicated by setting the control flag wTTYflg to TRUE. The TTY synthesis uses parameters such as the instantaneous phase, ph, frequency, f, and bit duration counter, dc. This synthesis procedure is described in further detail below with respect to FIG. 20. The parameter f is set based on the character bit, while the bit duration counter dc is reset to 176 for every new character bit and decremented after synthesis of every TTY sample. The instantaneous phase, ph, is varied smoothly from sample to sample in increments that are proportional to the frequency, f. Synthesis proceeds until the TTY signal buffer, $T_{out}$, is full, or all of the remaining TTY signal has been synthesized.

Referring back to FIGS. 19A and 19B, in step 1901 the TTY signal decoder 113 determines whether dTTYflg is equal to TRUE. If dTTYflg is equal to TRUE, then the process proceeds to step 1903, otherwise the process proceeds to step 1905.

In step 1903 the TTY signal decoder 113 copies the array dc to cb and sets the flag cbeflg equal to FALSE.

In step 1905 the TTY signal decoder 113 determines whether cbeflg is equal to FALSE and whether ocbeflg is equal to TRUE. If cbeflg is equal to FALSE and ocbeflg is equal to TRUE, then the process proceeds to step 1907, otherwise the process proceeds to step 1909.

In step 1907 the contents of the buffer cb are transferred to the working character buffer, ocb, and the pointer ocbptr is set equal to 0. Also, in step 1907 the flag ocbeflg is set equal to FALSE, the flag cbeflg is set equal to TRUE, and the bit duration counter, dc, is set equal to 176.

In step 1909, the TTY signal decoder 113 determines whether ocbeflg is equal to FALSE. If ocbeflg is equal to FALSE, then the process proceeds to step 1911.

In step 1911 the TTY signal decoder 113 sets wTTYflg equal to TRUE and sets the frequency, f, based on ocb [ocbprt]. If ocb[ocbprt] is a MARK or 1, f is set equal to the MARK frequency divided by the sampling rate (i.e., $1400/8000$). If ocb[ocbprt] is a SPACE or 0, f is set equal to the SPACE frequency divided by the sampling rate (i.e., $1800/8000$). Then, in step 1913 TTY tone synthesis is performed, as described in further detail below with respect to FIG. 20.

In step 1915 the TTY signal decoder 113 determines whether dc equals 0. If dc equals 0, then the process proceeds to step 1917. In step 1917 the TTY signal decoder 113 sets dc equal to 176 and increments ocbptr by 1.

In step 1919 the TTY signal decoder 113 determines whether ocbptr is greater than 7. If ocbptr is greater than 7, then the process proceeds to step 1921, otherwise the process proceeds to step 1927.

In step 1921 the TTY signal decoder 113 sets ocbeflg equal to TRUE and sets ocbptr equal to 0.

In step 1923 the TTY signal decoder 113 determines whether cbeflg is equal to FALSE. If cbeflg is equal to FALSE, then the process proceeds to step 1925, otherwise the process proceeds to step 1931.

In step 1925 the TTY signal decoder 113 copies the array cb to ocb, sets the flag ocbeflg equal to FALSE, and sets the flag cbeflg equal to TRUE. Next, the TTY signal decoder 113 sets the frequency f based on ocb[ptr]. Then, in step 1929 TTY tone synthesis is performed, as discussed below in greater detail with respect to FIG. 20.

If, in step 1923 cbeflg is equal to FALSE, then in step 1931 the instantaneous phase ph, is set equal to 0.0.

Figure 20:
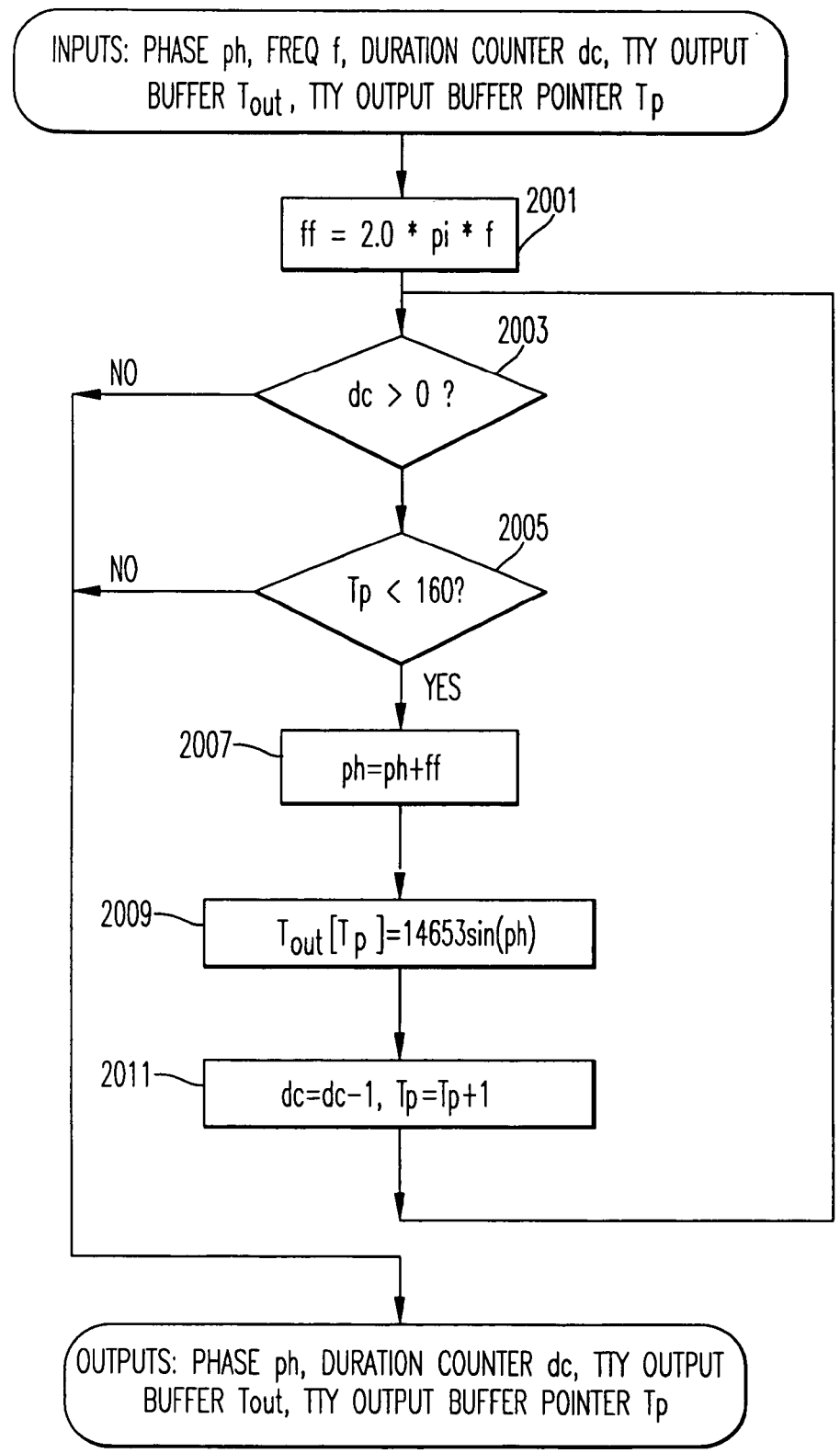
FIG. 20 is a flowchart for explaining TTY signal generation, according to one embodiment of the invention.

FIG. 20 describes how TTY signal generation (i.e., synthesis) is performed. In step 2001, the TTY signal decoder 113 sets a variable, ff, equal to $2 \times \pi \times f$. Then, in step 2003 the TTY signal decoder 113 determines whether dc is greater than 0. If dc is greater than 0, then the process proceeds to step 2005. In step 2005 TTY signal decoder 113 determines whether the TTY output buffer pointer, $T_p$, is less than 160. If $T_p$ is less than 160, then the process proceeds to step 2007.

In step 2007 TTY signal decoder 113 increments the instantaneous phase, ph, by ff. Then, in step 2009 TTY signal decoder 113 sets the TTY output buffer, $T_{out}[T_p]$, equal to 14653 sin (ph). Next, in step 2011, TTY decoder 113 decrements the bit duration counter, dc, by 1, and increments the TTY output buffer pointer $T_p$ by 1.

The performance of the present invention will now be described in the context of the 5.6 Kbps speech codec that was designed for IS-136+half-rate test. The performance measures in the absence of transmission errors would apply in any other context but the performance measures in the presence of transmission errors can only be considered as illustrative of our solution's potential in adverse channel conditions.

The performance measures are False Alarm with respect to Speech (FAS), False Alarm with respect to Tones (FAT), Printable Character Error Rate (PCER), and Total Character Error rate (TCER). The last two performance measures are from the utilities provided by UWCC/GTF for purposes of the IS-136+half-rate test. These performance measures are based on the score utility provided by Lober & Walsh. For measurement of FAS, over two hours of speech was used. For measurement of FAT, all tones ranging from 300 Hz to 3000 Hz in steps of 100 Hz were utilized. For TTY testing, random TTY characters generated by the prescription in Lober and Walsh were converted to TTY signals using the worst case frequency and level transmit deviation and random phases for both the frequency oscillators. This was presumed to be the worst case, and so 7 files were generated corresponding to 7 different seeds for the Lober and Walsh TTY character generation program for this worst case. The PCER and TCER scores are averaged over all 7 files. All performance measures are expressed in %.

The performance measures are tabulated in Table 3 for downlink and Table 4 for uplink. It is clear from these results that not only does the present invention meet the FCC mandate, it far exceeds it since the TCER is far below 1% at 16 dB C/N in the downlink and 18 dB C/N in the uplink. Indeed, the FCC mandate was exceeded even at 2 dB below the threshold C/N in both the links. No FALSE alarms, for either speech or tones, were encountered during testing.

TABLE 3

Performance Measures for Downlink

| Channel Condition | FAS (%) | FAT (%) | PCER (%) | TCER (%) |
|---|---|---|---|---|
| Clear Channel | 0.0 | 0.0 | 0.0 | 0.0 |
| 27.00 dB C/N, 10 Hz doppler | 0.0 | 0.0 | 0.0 | 0.0 |
| 24.25 dB C/N, 10 Hz doppler | 0.0 | 0.0 | 0.0 | 0.0 |
| 21.50 dB C/N, 10 Hz doppler | 0.0 | 0.0 | 0.0 | 0.0 |
| 18.75 dB C/N, 10 Hz doppler | 0.0 | 0.0 | 0.0 | 0.0 |
| 16.00 dB C/N, 10 Hz doppler | 0.0 | 0.0 | 0.0 | 0.0 |
| 14.00 dB C/N, 10 Hz doppler | 0.0 | 0.0 | 0.0 | 0.0 |
| 12.00 dB C/N, 10 Hz doppler | 0.0 | 0.0 | 0.0 | 0.0 |
| 27.00 dB C/N, 180 Hz doppler | 0.0 | 0.0 | 0.0 | 0.0 |
| 24.25 dB C/N, 180 Hz doppler | 0.0 | 0.0 | 0.0 | 0.0 |
| 21.50 dB C/N, 180 Hz doppler | 0.0 | 0.0 | 0.0 | 0.0 |
| 18.75 dB C/N, 180 Hz doppler | 0.0 | 0.0 | 0.0 | 0.0 |
| 16.00 dB C/N, 180 Hz doppler | 0.0 | 0.0 | 0.0 | 0.0 |
| 14.00 dB C/N, 180 Hz doppler | 0.0 | 0.0 | 0.0 | 0.0 |
| 12.00 dB C/N, 180 Hz doppler | 0.0 | 0.0 | 0.0 | 0.0 |

TABLE 4

Performance Measures for Uplink

| Channel Condition | FAS (%) | FAT (%) | PCER (%) | TCER (%) |
|---|---|---|---|---|
| Clear Channel | 0.0 | 0.0 | 0.0 | 0.0 |
| 29.00 dB C/N, 10 Hz doppler | 0.0 | 0.0 | 0.0 | 0.0 |
| 26.25 dB C/N, 10 Hz doppler | 0.0 | 0.0 | 0.0 | 0.0 |
| 23.50 dB C/N, 10 Hz doppler | 0.0 | 0.0 | 0.0 | 0.0 |
| 20.75 dB C/N, 10 Hz doppler | 0.0 | 0.0 | 0.0 | 0.0 |
| 18.00 dB C/N, 10 Hz doppler | 0.0 | 0.0 | 0.0 | 0.0 |
| 16.00 dB C/N, 10 Hz doppler | 0.0 | 0.0 | 0.0 | 0.0 |
| 14.00 dB C/N, 10 Hz doppler | 0.0 | 0.0 | 0.0 | 0.0 |
| 29.00 dB C/N, 180 Hz doppler | 0.0 | 0.0 | 0.0 | 0.0 |
| 26.25 dB C/N, 180 Hz doppler | 0.0 | 0.0 | 0.0 | 0.0 |
| 23.50 dB C/N, 180 Hz doppler | 0.0 | 0.0 | 0.0 | 0.0 |
| 20.75 dB C/N, 180 Hz doppler | 0.0 | 0.0 | 0.0 | 0.0 |
| 18.00 dB C/N, 180 Hz doppler | 0.0 | 0.0 | 0.0 | 0.0 |
| 16.00 dB C/N, 180 Hz doppler | 0.0 | 0.0 | 0.0 | 0.0 |
| 14.00 dB C/N, 180 Hz doppler | 0.0 | 0.0 | 0.0 | 0.0 |

According to one embodiment, all or a portion of the invention may be conveniently implemented using conventional general purpose computers or microprocessors programmed according to the teachings of the present invention, as will be apparent to those skilled in the computer art. Appropriate software can be readily prepared by programmers of ordinary skill based on the teachings of the present disclosure, as will be apparent to those skilled in the software art.

Figure 21:
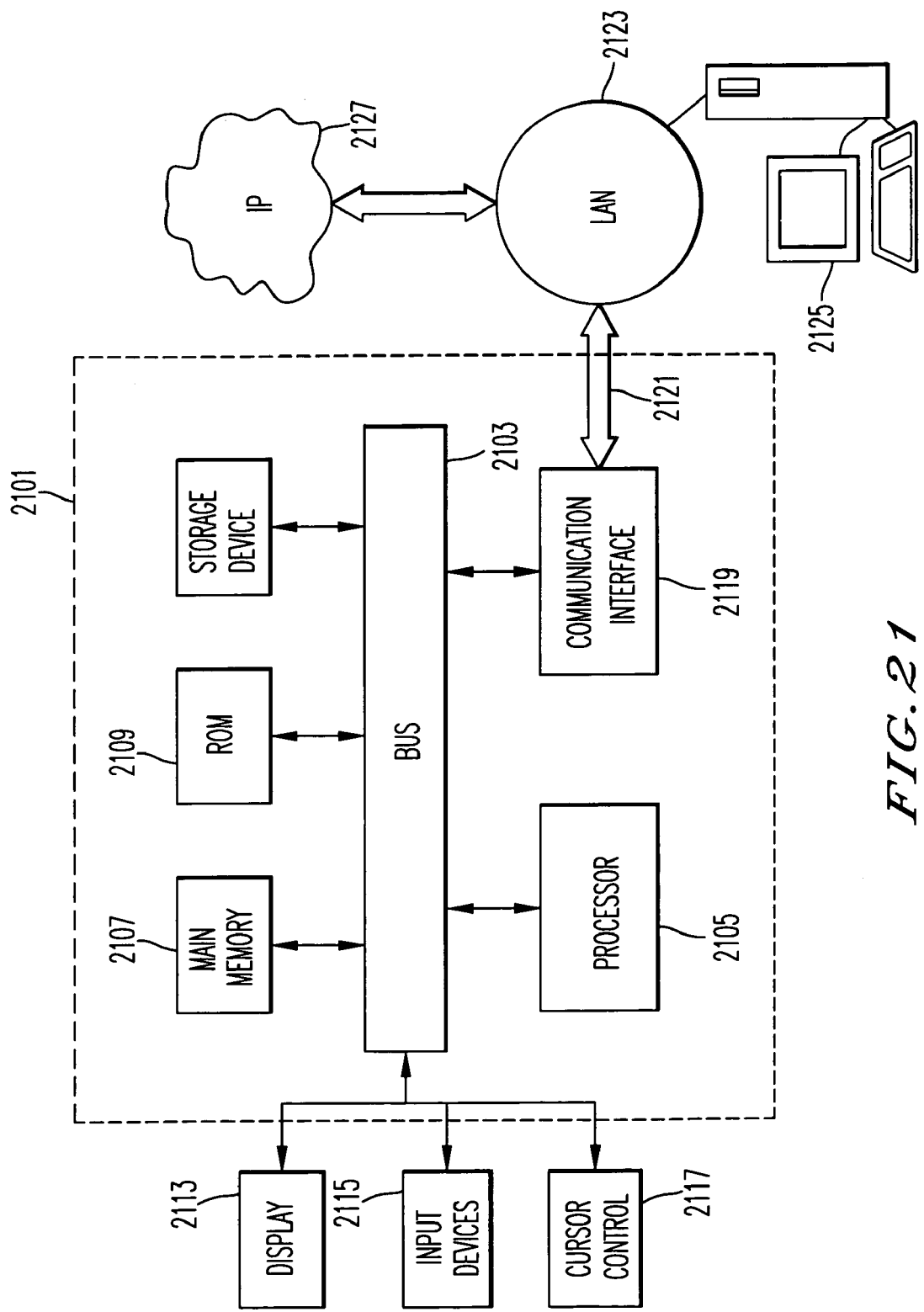
FIG. 21 is a schematic block diagram of a computer system programmed to perform one or more of the special purpose function(s) of the present invention.

FIG. 21 illustrates a computer system 2101 upon which an embodiment of the present invention may be implemented. Computer system 2101 includes a bus 2103 or other communication mechanism for communicating information, and a processor 2105 coupled with bus 2103 for processing the information. Computer system 2101 also includes a main memory 2107, such as a random access memory (RAM) or other dynamic storage device (e.g., dynamic RAM (DRAM), static RAM (SRAM), and synchronous DRAM (SDRAM)), coupled to bus 2103 for storing information and instructions to be executed by processor 2105. In addition, main memory 2107 may be used for storing temporary variables or other intermediate information during execution of instructions to be executed by processor 2105. Computer system 2101 further includes a read only memory (ROM) 2109 or other static storage device (e.g., programmable ROM (PROM), erasable PROM (EPROM), and electrically erasable PROM (EEPROM), and flash ROM) coupled to bus 2103 for storing static information and instructions for processor 2105. A storage device 2111, such as a magnetic disk or optical disc, is provided and coupled to bus 2103 for storing information and instructions.

The computer system 2101 may also include special purpose logic devices (e.g., application specific integrated circuits (ASICs)) or configurable logic devices (e.g., generic array of logic (GAL) or reprogrammable field programmable gate arrays (FPGAs)). Other removable media devices (e.g., a compact disc, a tape, and a removable magneto-optical media) or fixed, high density media drives, may be added to the computer system 2101 using an appropriate device bus (e.g., a small computer system interface (SCSI) bus, an enhanced integrated device electronics (IDE) bus, or an ultra-direct memory access (DMA) bus). The computer system 2101 may additionally include a compact disc reader, a compact disc reader-writer unit, or a compact disc juke box, each of which may be connected to the same device bus or another device bus.

Computer system 2101 may be coupled via bus 2103 to a display 2113, such as a cathode ray tube (CRT), for displaying information to a computer user. The display 2113 may be controlled by a display or graphics card. The computer system includes input devices, such as a keyboard 2115 and a cursor control 2117, for communicating information and command selections to processor 2105. The cursor control 2117, for example, is a mouse, a trackball, or cursor direction keys for communicating direction information and command selections to processor 2105 and for controlling cursor movement on the display 2113. In addition, a printer may provide printed listings of any data stored and/or generated by the computer system 2101.

The computer system 2101 performs a portion or all of the processing steps of the invention in response to processor 2105 executing one or more sequences of one or more instructions contained in a memory, such as the main memory 2107. For example, the computer system 2101 may perform all or a part of the processing of the TTY signal encoder 103. Such instructions may be read into the main memory 2107 from another computer-readable medium, such as storage device 2111. One or more processors in a multi-processing arrangement may also be employed to execute the sequences of instructions contained in main memory 2107. In alternative embodiments, hard-wired circuitry may be used in place of or in combination with software instructions. Thus, embodiments are not limited to any specific combination of hardware circuitry and software.

As stated above, the system 2101 includes at least one computer readable medium, memory, computer code device, or computer code mechanism programmed according to the teachings of the invention and for containing data structures, tables, records, or other data described herein. Stored on any one or on a combination of computer readable media, the present invention includes software for controlling the computer system 2101, for driving a device or devices for implementing the invention, and for enabling the computer system 2101 to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention. The computer code devices of the present invention may be any interpreted or executable code mechanisms, including but not limited to scripts, interpreters, dynamic link libraries, Java classes, and complete executable programs. Moreover, parts of the processing of the present invention may be distributed for better performance, reliability, and/or cost.

The term "computer readable medium" as used herein refers to any medium that participates in providing instructions to processor 2105 for execution. A computer readable medium may take many forms, including but not limited to, non-volatile media, volatile media, and transmission media. Non-volatile media includes, for example, optical discs, magnetic disks, and magneto-optical disks, such as storage device 2111. Volatile media includes dynamic memory, such as main memory 2107. Transmission media includes coaxial cables, copper wire and fiber optics, including the wires that comprise bus 2103. Transmission media also may also take the form of acoustic or light waves, such as those generated during radio wave and infrared data communications.

Common forms of computer readable media include, for example, hard disks, floppy disks, tape, magneto-optical disks, PROMs (EPROM, EEPROM, Flash EPROM), DRAM, SRAM, SDRAM, or any other magnetic medium, compact disks (e.g., CD-ROM), or any other optical medium, punch cards, paper tape, or other physical medium with patterns of holes, a carrier wave (described below), or any other medium from which a computer can read.

Various forms of computer readable media may be involved in carrying out one or more sequences of one or more instructions to processor 2105 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to computer system 2101 may receive the data on the telephone line and use an infrared transmitter to convert the data to an infrared signal. An infrared detector coupled to bus 2103 can receive the data carried in the infrared signal and place the data on bus 2103. Bus 2103 carries the data to main memory 2107, from which processor 2105 retrieves and executes the instructions. The instructions received by main memory 2107 may optionally be stored on storage device 2111 either before or after execution by processor 2105.

Computer system 2101 also includes a communication interface 2119 coupled to bus 2103. Communication interface 2119 provides a two-way data communication coupling to a network link 2121 that is connected to a local network (e.g., LAN 2123). For example, communication interface 2119 may be a network interface card to attach to any packet switched local area network (LAN). As another example, communication interface 2119 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 2119 sends and receives electrical, electromagnetic, or optical signals that carry digital data streams representing various types of information.

Network link 2121 typically provides data communication through one or more networks to other data devices. For example, network link 2121 may provide a connection through LAN 2123 to a host computer 2125, another computer system 2101, or to data equipment operated by a service provider, which provides data communication services through an IP (Internet Protocol) network 2127. LAN 2123 and IP network 2127 both use electrical, electromagnetic, or optical signals that carry digital data streams. The signals through the various networks and the signals on network link 2121 and through communication interface 2119, which carry the digital data to and from computer system 2101, are exemplary forms of carrier waves transporting the information. Computer system 2101 can transmit notifications and receive data, including program code, through the network(s), network link 2121 and communication interface 2119.

Obviously, numerous modifications and variations of the present invention are possible in light of the above teachings. It is therefore to be understood that within the scope of the appended claims, the invention may be practiced otherwise than as specifically described herein.

What is claimed is:

1. A method comprising the steps of:
   receiving an input signal;
   generating a teletypewriter (TTY) indicator signal from the input signal;
   determining that the input signal is a TTY signal comprising a TTY character, based on the TTY indicator signal; and
   constructing a TTY packet including the TTY character of the TTY signal in response to determining that the input signal is a TTY signal; and
   wherein the first bits of the TTY packet carry information and the remaining bits of the TTY packet are set to zero.

2. A method according to claim 1, wherein the first bits of the TTY packet comprise: a TTY header, a start bit, data bits, an end bit, a TTY character number, and a TTY character repetition number.

3. A method comprising the steps of:
   receiving an input signal;
   generating a teletypewriter (TTY) indicator signal from the input signal;
   determining that the input signal is a TTY signal comprising a TTY character, based on the TTY indicator signal; and
   constructing a TTY packet including the TTY character of the TTY signal in response to determining that the input signal is a TTY signal; and
   wherein the step of generating a TTY indicator signal comprises:
   filtering the input signal to generate a filtered input signal;
   determining the local energies of the filtered input signal over portions of the filtered input signal; and
   generating the TTY indicator signal on the basis of the local energies of the filtered input signal.

4. A method according to claim 3, wherein the step of filtering the input signal comprises filtering the input signal with a MARK bandpass filter.

5. A method according to claim 3, wherein the step of filtering the input signal comprises filtering the input signal with a SPACE bandpass filter.

6. A method according to claim 3, wherein the step of determining the local energies comprises the step of determining the local energies recursively, based on prior samples of the input signal.

7. A method according to claim 3, further comprising the step of median filtering the local energies of the filtered input signal.

8. A method comprising the steps of:
   receiving a bitstream;
   determining that a TTY character is present in the received bitstream;
   validating the TTY character;
   synthesizing a TTY signal from the TTY character; and outputting the synthesized TTY signal if the TTY character is validated; and
   wherein the step of synthesizing comprises elastically buffering TTY character bits of the TTY character; and
   wherein the step of elastically buffering comprises:
   receiving the TTY character bits in a first buffer until the first buffer is full;
   transferring the TTY character bits from the first buffer to a second buffer if the second buffer is empty; and
   synthesizing the TTY signal from the TTY character bits stored in the second buffer until the second buffer is empty.

9. A system comprising:
   an input node configured to receive a communications signal; and
   a signal encoder coupled to the input node and configured to:
   generate a teletypewriter (TTY) indicator signal from the communications signal;
   determine whether the communications signal is a TTY signal comprising a TTY character, based on the TTY indicator signal; and
   construct a TTY packet including the TTY character of the TTY signal in response to determining that the communications signal is a TTY signal: and
   wherein the first bits of the TTY packet carry information and the remaining bits of the TTY packet are set to zero.

10. A system according to claim 9, wherein the first bits of the TTY packet comprise: a TTY header, a start bit, data bits, an end bit, a TTY character number, and a TTY character repetition number.

11. A system comprising:
    an input node configured to receive a communications signal; and
    a signal encoder coupled to the input node and configured to:
    generate a teletypewriter (TTY) indicator signal from the communications signal;
    determine whether the communications signal is a TTY signal comprising a TTY character, based on the TTY indicator signal; and
    construct a TTY packet including the TTY character of the TTY signal in response to determining that the communications signal is a TTY signal; and
    wherein the signal encoder is further configured to:
    filter the communication signal to generate a filtered signal;
    determine the local energies of the filtered signal over portions of the filtered signal; and
    generate the TTY indicator signal on the basis of the local energies of the filtered input signal.

12. A system according to claim 11, wherein the encoder comprises:
    a MARK bandpass filter configured to filter the communications signal and generate the filtered signal.

13. A system according to claim 11, wherein the encoder comprises:
    a SPACE bandpass filter configured to filter the communications signal and generate the filtered signal.

14. A system according to claim 11, wherein the signal encoder is further configured to determine the local energies recursively, based on prior samples of the input signal.

15. A system according to claim 11, wherein the signal encoder is further configured to median filter the local energies of the filtered input signal.

16. A system comprising:
   receiving node configured to receive a bitstream;
   a signal decoder coupled to the receiving node and configured to:
      determine that a TTY character is present in the received bitstream;
      determine whether the TTY character is valid;
      elastically buffer TTY character bits of the TTY character; and
      synthesize a TTY signal from the TTY character: and
   a selector coupled to the signal decoder and configured to output the synthesized TTY signal if the TTY character is valid
   wherein the signal decoder is further configured to:
      receive the TTY character bits in a first buffer until the first buffer is full;
      transfer the TTY character bits from the first buffer to a second buffer if the second buffer is empty; and
      synthesize the TTY signal from the TTY character bits stored in the second buffer until the second buffer is empty.

17. A system comprising:
   means for receiving an input signal;
   means for generating a teletypewriter TTY) indicator signal from the input signal;
   means for determining that the input signal is a TTY signal comprising a TTY character, based on the TTY indicator signal; and
   means for constructing a TTY packet including the TTY character of the TTY signal in response to determining that the input signal is a TTY signal; and
   wherein the first bits of the TTY packet carry information and the remaining bits of the TTY packet are set to zero.

18. A system according to claim 17, wherein the first bits of the TTY packet comprise: a TTY header, a start bit, data bits, an end bit, a TTY character number, and a TTY character repetition number.

19. A system comprising:
   means for receiving an input signal;
   means for generating a teletypewriter (TTY) indicator signal from the input signal;
   means for determining that the input signal is a TTY signal comprising a TTY character, based on the TTY indicator signal; and
   means for constructing a TTY packet including the TTY character of the TTY signal in response to determining that the input signal is a TTY signal; and
   wherein the means for generating a TTY indicator signal comprises:
      means for filtering the input signal to generate a filtered input signal;
      means for determining the local energies of the filtered input signal over portions of the filtered input signal; and
      means for generating the TTY indicator signal on the basis of the local energies of the filtered input signal.

20. A system according to claim 19, wherein the means for filtering the input signal comprises:
   a MARK bandpass filter for filtering the input signal with a MARK bandpass filter.

21. A system according to claim 19, wherein the means for filtering the input signal comprises:
   a SPACE bandpass filter for filtering the input signal.

22. A system according to claim 19, wherein the means for determining the local energies comprises means for determining the local energies recursively, based on prior samples of the input signal.

23. A system according to claim 19, further comprising means for median filtering the local energies of the filtered input signal.

24. A system comprising:
   means for receiving a bitstream;
   means for determining that a TTY character is present in the received bitstream;
   means for validating the TTY character
   means for synthesizing a TTY signal from the TTY character; and
   means for outputting the synthesized TTY signal if the TTY character is validated; and
   wherein the means for synthesizing comprises means for elastically buffering TTY character bits of the TTY character; and
   wherein the means for elastically buffering comprises:
      means for receiving the TTY character bits in a first buffer until the first buffer is full;
      means for transferring the TTY character bits from the first buffer to a second buffer if the second buffer is empty; and
      means for synthesizing the TTY signal from the TTY character bits stored in the second buffer until the second buffer is empty.

25. A computer program product, comprising:
   a computer storage medium and a computer program code mechanism embedded in the computer storage medium for encoding a communications signal, the computer program code mechanism comprising:
      a first computer code device configured to generate a teletypewriter (TTY) indicator signal from an input signal;
      a second computer code device configured to determine whether the input signal is a TTY signal comprising a TTY character, based on the TTY indicator signal; and
      a third computer code device configured to construct a TTY packet including the TTY character of the TTY signal if the input signal is determined to be a TTY signal; and
   wherein the first bits of the TTY packet carry information and the remaining bits of the TTY packet are set to zero.

26. A computer program product according to claim 25, wherein the first bits of the TTY packet comprise: a TTY header, a start bit, data bits, an end bit, a TTY character number, and a TTY character repetition number.

27. A computer program product, comprising:
   a computer storage medium and a computer program code mechanism embedded in the computer storage medium for encoding a communications signal, the computer program code mechanism comprising;
      a first computer code device configured to generate a teletypewriter (TTY) indicator signal from an input signal;
      a second computer code device configured to determine whether the input signal is a TTY signal comprising a TTY character, based on the TTY indicator signal; and
      a third computer code device configured to construct a TTY packet including the TTY character of the TTY signal if the input signal is determined to be a TTY signal; and wherein the first computer code device comprises:
a fourth computer code device configured to filter the input signal to generate a filtered input signal;
a fifth computer code device configured to determine the local energies of the filtered input signal over portions of the filtered input signal; and
a sixth computer code device configured to generate the TTY indicator signal on the basis of the local energies of the filtered input signal.

28. A computer program product according to claim 27, wherein the fourth computer code device comprises a MARK bandpass filter.

29. A computer program product according to claim 27, wherein the fourth computer code device comprises a SPACE bandpass filter.

30. A computer program product according to claim 27, wherein the fifth computer code device comprises a seventh computer code device configured to determine the local energies recursively, based on prior samples of the input signal.

31. A computer program product according to claim 27, further comprising a seventh computer code device configured to median filter the local energies of the filtered input signal.

32. A computer program product, comprising:
a computer storage medium and a computer program code mechanism embedded in the computer storage medium for encoding a communications signal, the computer program code mechanism comprising:
a first computer code device configured to receive a bitstream;
a second computer code device configured to determine that a TTY character is present in the received bitstream;
a third computer code device configured to validate the TTY character; and
a fourth computer code device configured to synthesize a TTY signal from the TTY character;
a fifth computer code device configured to output the synthesized TTY signal if the TTY character is validated: and
wherein the fourth computer code device comprises a sixth computer code device configured to elastically buffer TTY character bits of the TTY character; and
wherein the sixth computer code device comprises:
a seventh computer code device configured to receive the TTY character bits in a first buffer until the first buffer is full;
a eighth computer code device configured to transfer the TTY character bits from the first buffer to a second buffer if the second buffer is empty; and
a ninth computer code device configured to synthesize the TTY signal from the TTY character bits stored in the second buffer until the second buffer is empty.

* * * * *